(12) United States Patent
Douthat et al.

(10) Patent No.: US 11,561,593 B2
(45) Date of Patent: Jan. 24, 2023

(54) POINT OF SALE DEVICE POWER MANAGEMENT AND UNDERVOLTAGE PROTECTION

(71) Applicant: Block, Inc., Oakland, CA (US)

(72) Inventors: Cory Douthat, San Francisco, CA (US); Jeremy Wade, San Francisco, CA (US); Matthew H. Maibach, San Francisco, CA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 16/923,671

(22) Filed: Jul. 8, 2020

(65) Prior Publication Data

US 2020/0334657 A1 Oct. 22, 2020

Related U.S. Application Data

(63) Continuation of application No. 15/582,166, filed on Apr. 28, 2017, now Pat. No. 10,733,589.

(51) Int. Cl.
*G06F 1/3212* (2019.01)
*G06F 1/28* (2006.01)
(Continued)

(52) U.S. Cl.
CPC ............. *G06F 1/28* (2013.01); *G06F 1/30* (2013.01); *G06F 1/324* (2013.01); *G06F 1/329* (2013.01);
(Continued)

(58) Field of Classification Search
CPC .............. G06Q 20/209; G06Q 20/206; G06Q 20/204; H02J 13/00; H02J 13/0003;
(Continued)

(56) References Cited

U.S. PATENT DOCUMENTS 3,128,349 A 4/1964 Boesch et al.
4,758,714 A 7/1988 Carlson et al.
(Continued)

FOREIGN PATENT DOCUMENTS

AU 2324402 A 6/2002
DE 20320080 U1 4/2004
(Continued)

OTHER PUBLICATIONS

Stephen A. Sherman et al., "Secure Network Access Using Multiple Applications of AT&T's Smart Card," AT&T Technical Journal, Sep./Oct. 1994.
(Continued)

*Primary Examiner* — Eyob Hagos
(74) *Attorney, Agent, or Firm* — Polsinelli PC

(57) ABSTRACT

A point-of-sale (POS) device includes a processor, a battery, a transaction object reader, a printer with a printer controller, and optionally a temperature sensor. The processor determines a present power discharge capability rate of the battery, optionally based on a temperature measured by the temperature sensor. The processor also calculates a first estimated power draw rate based on a first setting value for at least one of the components of the POS device, such as the printer. If the first estimated power draw rate is dangerously close to the present power discharge capability rate of the battery, a second estimated power draw rate is calculated based on a second setting value for the one or more components. If the second estimated power draw rate is no longer dangerously close to the present power discharge capability rate of the battery, the components are set to the second settings value.

21 Claims, 8 Drawing Sheets

(51) Int. Cl.
*H04N 1/00* (2006.01)
*G06Q 20/20* (2012.01)
*G06K 7/08* (2006.01)
*G06F 1/3234* (2019.01)
*G06F 1/329* (2019.01)
*G07G 1/12* (2006.01)
*G06F 1/30* (2006.01)
*G06F 1/3287* (2019.01)
*G06F 1/324* (2019.01)
*G07F 19/00* (2006.01)
*H02J 13/00* (2006.01)
*G06F 21/86* (2013.01)

(52) U.S. Cl.
CPC .......... *G06F 1/3212* (2013.01); *G06F 1/3234* (2013.01); *G06F 1/3243* (2013.01); *G06F 1/3265* (2013.01); *G06F 1/3284* (2013.01); *G06F 1/3287* (2013.01); *G06F 21/86* (2013.01); *G06K 7/08* (2013.01); *G06Q 20/204* (2013.01); *G06Q 20/206* (2013.01); *G06Q 20/209* (2013.01); *G07F 19/209* (2013.01); *G07G 1/12* (2013.01); *H02J 13/00* (2013.01); *H04N 1/00899* (2013.01); *H04N 2201/0082* (2013.01)

(58) Field of Classification Search
CPC .......... G06F 1/3243; G06F 1/329; G06F 1/30; G06F 1/3212; G06F 1/3234; G06F 1/3284; G06F 1/3287; G06F 1/324; G06F 1/3265; G06F 1/28; G06F 21/86; G07G 1/12; G07F 19/209; H04N 1/00899; H04N 2201/0082; G06K 7/08; Y02D 10/00
See application file for complete search history.

(56) References Cited

U.S. PATENT DOCUMENTS

| | | | |
|---|---|---|---|
| 4,776,003 A | 10/1988 | Harris | |
| 4,860,336 A | 8/1989 | D'Avello et al. | |
| 5,221,838 A | 6/1993 | Gutman et al. | |
| 5,351,296 A | 9/1994 | Sullivan | |
| 5,388,155 A | 2/1995 | Smith | |
| 5,408,513 A | 4/1995 | Busch, Jr. et al. | |
| 5,714,741 A | 2/1998 | Pieterse et al. | |
| 5,729,591 A | 3/1998 | Bailey | |
| 5,740,232 A | 4/1998 | Pailles et al. | |
| 5,752,046 A | 5/1998 | Oprescu et al. | |
| 5,838,773 A | 11/1998 | Eisner et al. | |
| 5,850,599 A | 12/1998 | Seiderman | |
| 5,867,795 A | 2/1999 | Novis et al. | |
| 5,940,510 A | 8/1999 | Curry et al. | |
| 6,010,067 A | 1/2000 | Elbaum | |
| 6,065,679 A | 5/2000 | Levie et al. | |
| 6,098,881 A | 8/2000 | Deland, Jr. et al. | |
| 6,144,336 A | 11/2000 | Preston et al. | |
| 6,234,389 B1 | 5/2001 | Valliani et al. | |
| 6,278,779 B1 | 8/2001 | Bryant et al. | |
| 6,481,623 B1 | 11/2002 | Grant et al. | |
| 6,600,823 B1 | 7/2003 | Hayosh | |
| 6,886,742 B2 | 5/2005 | Stoutenburg et al. | |
| 6,990,683 B2 | 1/2006 | Itabashi | |
| 7,003,316 B1 | 2/2006 | Elias et al. | |
| 7,066,382 B2 | 6/2006 | Kaplan | |
| 7,083,090 B2 | 8/2006 | Zuili | |
| 7,124,937 B2 | 10/2006 | Myers et al. | |
| 7,163,148 B2 | 1/2007 | Durbin et al. | |
| 7,210,627 B2 | 5/2007 | Morley et al. | |
| 7,343,496 B1 | 3/2008 | Hsiang et al. | |
| 7,363,054 B2 | 4/2008 | Elias et al. | |
| 7,424,732 B2 | 9/2008 | Matsumoto et al. | |
| 7,433,452 B2 | 10/2008 | Taylor et al. | |
| 7,502,878 B1 | 3/2009 | Wright | |
| 7,506,956 B2 | 3/2009 | Usui | |
| 7,515,962 B2 * | 4/2009 | Lyden | G01R 31/3647 607/29 |
| 7,591,425 B1 | 9/2009 | Zuili et al. | |
| 7,673,799 B2 | 3/2010 | Hart et al. | |
| 7,810,729 B2 | 10/2010 | Morley, Jr. | |
| 7,896,248 B2 | 3/2011 | Morley, Jr. | |
| 8,086,531 B2 | 12/2011 | Litster et al. | |
| 8,126,734 B2 | 2/2012 | Dicks et al. | |
| 8,265,553 B2 | 9/2012 | Cheon et al. | |
| 8,355,003 B2 | 1/2013 | Pope | |
| 8,397,988 B1 | 3/2013 | Zuili | |
| 8,553,055 B1 | 10/2013 | Martell et al. | |
| 8,702,007 B2 | 4/2014 | Yisraelian et al. | |
| 9,020,853 B2 | 4/2015 | Hoffman et al. | |
| 9,092,766 B1 | 7/2015 | Bedier et al. | |
| 9,223,376 B2 | 12/2015 | Derbyshire et al. | |
| 9,344,281 B2 | 5/2016 | Kobres et al. | |
| 9,355,277 B2 | 5/2016 | Kobres et al. | |
| 9,396,368 B1 | 7/2016 | Lamba et al. | |
| 9,489,703 B2 | 11/2016 | Kauniskangas et al. | |
| 9,529,758 B1 | 12/2016 | Szeto | |
| 9,590,747 B2 | 3/2017 | Thoukydides et al. | |
| 9,607,181 B2 | 3/2017 | Matsumoto et al. | |
| 9,659,441 B2 | 5/2017 | Kelly et al. | |
| 9,679,286 B2 | 6/2017 | Colnot et al. | |
| 9,824,350 B2 | 11/2017 | Dorsey et al. | |
| 10,140,604 B1 | 11/2018 | Douthat et al. | |
| 10,182,328 B1 | 1/2019 | Maibach et al. | |
| 10,380,471 B2 * | 8/2019 | Locke | G06K 19/0704 |
| 10,733,589 B2 | 8/2020 | Douthat et al. | |
| 10,970,698 B1 | 4/2021 | Binder et al. | |
| 11,257,058 B1 | 2/2022 | Douthat et al. | |
| 2002/0091633 A1 | 7/2002 | Proctor | |
| 2002/0153414 A1 | 10/2002 | Stoutenburg et al. | |
| 2003/0135418 A1 | 7/2003 | Shekhar et al. | |
| 2003/0154414 A1 | 8/2003 | von Mueller et al. | |
| 2003/0183691 A1 | 10/2003 | Lahteenmaki et al. | |
| 2003/0200108 A1 | 10/2003 | Malnoe | |
| 2004/0012875 A1 | 1/2004 | Wood | |
| 2004/0041911 A1 | 3/2004 | Odagiri et al. | |
| 2004/0059682 A1 | 3/2004 | Hasumi et al. | |
| 2004/0088449 A1 | 5/2004 | Sakaki | |
| 2004/0167820 A1 | 8/2004 | Melick et al. | |
| 2004/0204082 A1 | 10/2004 | Abeyta | |
| 2004/0251908 A1 | 12/2004 | Knopf | |
| 2005/0097015 A1 | 5/2005 | Wilkes et al. | |
| 2005/0109841 A1 | 5/2005 | Ryan et al. | |
| 2005/0179956 A1 | 8/2005 | Silverbrooks et al. | |
| 2005/0236480 A1 | 10/2005 | Vrotsos et al. | |
| 2006/0032905 A1 | 2/2006 | Bear et al. | |
| 2006/0049255 A1 | 3/2006 | Von Mueller et al. | |
| 2006/0049256 A1 | 3/2006 | Von Mueller et al. | |
| 2006/0056401 A1 | 3/2006 | Bohm et al. | |
| 2006/0223580 A1 | 10/2006 | Antonio et al. | |
| 2007/0067833 A1 | 3/2007 | Colnot | |
| 2007/0168300 A1 | 7/2007 | Quesselaire et al. | |
| 2007/0194104 A1 | 8/2007 | Fukuda et al. | |
| 2007/0198436 A1 | 8/2007 | Weiss | |
| 2007/0255885 A1 | 11/2007 | Bohm et al. | |
| 2008/0091617 A1 | 4/2008 | Hazel et al. | |
| 2008/0104631 A1 | 5/2008 | Krock et al. | |
| 2008/0148394 A1 | 6/2008 | Poidomani et al. | |
| 2008/0238687 A1 | 10/2008 | Ozer et al. | |
| 2009/0070583 A1 | 3/2009 | von Mueller et al. | |
| 2009/0112768 A1 | 4/2009 | Hammad et al. | |
| 2009/0164326 A1 | 6/2009 | Bishop et al. | |
| 2009/0271270 A1 | 10/2009 | Regmi et al. | |
| 2009/0317161 A1 | 12/2009 | Vo et al. | |
| 2010/0057620 A1 | 3/2010 | Li et al. | |
| 2010/0220136 A1 | 9/2010 | Sheahan et al. | |
| 2010/0243732 A1 | 9/2010 | Wallner | |
| 2011/0019234 A1 * | 1/2011 | Nakamura | H04N 1/00347 358/1.15 |
| 2011/0078034 A1 | 3/2011 | Hayhow | |
| 2011/0080422 A1 * | 4/2011 | Lee | G06F 1/3203 345/589 |
| 2011/0321173 A1 | 12/2011 | Weston et al. | |

(56) References Cited

U.S. PATENT DOCUMENTS

| | | | |
|---|---|---|---|
| 2012/0039469 A1 | 2/2012 | Mueller et al. | |
| 2012/0060041 A1* | 3/2012 | Hashimoto | G06F 1/3209 713/310 |
| 2012/0203620 A1 | 8/2012 | Dobyns | |
| 2013/0013515 A1 | 1/2013 | Walters et al. | |
| 2013/0079037 A1 | 3/2013 | Dobyns | |
| 2013/0094668 A1 | 4/2013 | Poulsen et al. | |
| 2013/0103190 A1 | 4/2013 | Carapelli | |
| 2013/0254579 A1* | 9/2013 | Derbyshire | H04W 52/0277 713/340 |
| 2013/0262708 A1 | 10/2013 | McLeod | |
| 2014/0021254 A1 | 1/2014 | Marshall et al. | |
| 2014/0108241 A1 | 4/2014 | Tunnell et al. | |
| 2014/0127995 A1 | 5/2014 | Hendricksen et al. | |
| 2014/0191913 A1 | 7/2014 | Ge et al. | |
| 2014/0206339 A1 | 7/2014 | Lindoff | |
| 2014/0249942 A1 | 9/2014 | Hicks et al. | |
| 2014/0268458 A1* | 9/2014 | Luciani | H02H 3/10 361/87 |
| 2014/0295777 A1 | 10/2014 | Wang | |
| 2014/0368339 A1 | 12/2014 | Thaker et al. | |
| 2015/0199882 A1* | 7/2015 | Fernando | G07G 1/0018 345/173 |
| 2015/0227485 A1 | 8/2015 | Maung et al. | |
| 2015/0254621 A1* | 9/2015 | Matsumoto | G06Q 20/20 705/16 |
| 2015/0269805 A1 | 9/2015 | Korala | |
| 2015/0302708 A1 | 10/2015 | Hattori | |
| 2016/0014623 A1 | 1/2016 | Tanner et al. | |
| 2016/0064979 A1* | 3/2016 | Huang | H02J 7/0071 320/114 |
| 2016/0117662 A1 | 4/2016 | Bedier et al. | |
| 2016/0125376 A1 | 5/2016 | Beatty et al. | |
| 2016/0154967 A1 | 6/2016 | Lee et al. | |
| 2016/0174038 A1 | 6/2016 | Menardais et al. | |
| 2016/0211843 A1 | 7/2016 | Wang | |
| 2016/0275478 A1 | 9/2016 | Li et al. | |
| 2016/0307010 A1 | 10/2016 | Ge et al. | |
| 2016/0307171 A1 | 10/2016 | Haga | |
| 2016/0335132 A1* | 11/2016 | Ash | G06F 9/505 |
| 2017/0004485 A1 | 1/2017 | Lee et al. | |
| 2017/0017943 A1 | 1/2017 | Bilhan et al. | |
| 2017/0076269 A1 | 3/2017 | Saeed et al. | |
| 2017/0160819 A1 | 6/2017 | Yi et al. | |
| 2017/0220822 A1 | 8/2017 | Kobres et al. | |
| 2017/0255927 A1 | 9/2017 | Dorsey et al. | |
| 2017/0300893 A1* | 10/2017 | Sasaki | G06F 3/0486 |
| 2017/0309137 A1 | 10/2017 | Shah et al. | |
| 2017/0337403 A1 | 11/2017 | Ohno | |
| 2018/0026373 A1 | 1/2018 | Schwent et al. | |
| 2018/0314661 A1 | 11/2018 | Douthat et al. | |
| 2018/0316815 A1 | 11/2018 | Douthat et al. | |
| 2018/0366978 A1* | 12/2018 | Matan | H02J 3/003 |
| 2021/0216988 A1 | 7/2021 | Binder et al. | |
| 2022/0164782 A1 | 5/2022 | Douthat et al. | |

FOREIGN PATENT DOCUMENTS

| | | |
|---|---|---|
| DE | 201 22 899 U1 | 4/2009 |
| EP | 0 895 203 A2 | 2/1999 |
| EP | 1205895 A2 | 5/2002 |
| EP | 1 874 014 A2 | 1/2008 |
| EP | 2 965 167 A1 | 1/2016 |
| EP | 3152666 A1 | 4/2017 |
| FR | 2 812 744 A1 | 2/2002 |
| FR | 2 812 745 A1 | 2/2002 |
| FR | 2 834 156 A1 | 6/2003 |
| JP | H09231285 A | 9/1997 |
| JP | 2000-030146 A | 1/2000 |
| JP | 2000-071580 A | 3/2000 |
| JP | 2000-276539 A | 10/2000 |
| JP | 2001-222595 A | 8/2001 |
| JP | 2002-074507 A | 3/2002 |
| JP | 2002-123771 A | 4/2002 |
| JP | 2002-137506 A | 5/2002 |
| JP | 2002-279320 A | 9/2002 |
| JP | 2002-352166 A | 12/2002 |
| JP | 2002-358285 A | 12/2002 |
| JP | 2003-108777 A | 4/2003 |
| JP | 2003-281453 A | 10/2003 |
| JP | 2003-308438 A | 10/2003 |
| JP | 2003-316558 A | 11/2003 |
| JP | 2004-054651 A | 2/2004 |
| JP | 2004-062733 A | 2/2004 |
| JP | 2004-078553 A | 3/2004 |
| JP | 2004-078662 A | 3/2004 |
| JP | 2004-157604 A | 6/2004 |
| JP | 2004-199405 A | 7/2004 |
| JP | 2004-351899 A | 12/2004 |
| JP | 2006-195589 A | 7/2006 |
| JP | 2007-042103 A | 2/2007 |
| JP | 2008-176390 A | 7/2008 |
| JP | 4248820 B2 | 4/2009 |
| JP | 2010-218196 A | 9/2010 |
| JP | 2011-138424 A | 7/2011 |
| JP | 2013-511787 A | 4/2013 |
| JP | 2013-086448 A | 5/2013 |
| JP | 2013-222444 A | 10/2013 |
| JP | 2014-232479 A | 12/2014 |
| JP | 2015-170356 A | 9/2015 |
| JP | 2016-514442 A | 5/2016 |
| JP | 2017-056698 A | 3/2017 |
| JP | 2021-177405 A | 11/2021 |
| KR | 10-1999-0066397 A | 8/1999 |
| KR | 10-1999-0068618 A | 9/1999 |
| KR | 200225019 B1 | 3/2001 |
| KR | 10-2003-0005936 A | 1/2003 |
| KR | 10-2003-0005984 A | 1/2003 |
| KR | 10-2003-0012910 A | 2/2003 |
| KR | 200333809 B1 | 11/2003 |
| KR | 10-2004-0016548 A | 2/2004 |
| KR | 100447431 B1 | 9/2004 |
| KR | 200405877 B1 | 1/2006 |
| KR | 100649151 B1 | 11/2006 |
| KR | 10-2007-0107990 A | 11/2007 |
| KR | 100842484 B1 | 7/2008 |
| RU | 2284578 C1 | 9/2006 |
| WO | 1998/012674 A2 | 3/1998 |
| WO | 2000/011624 A1 | 3/2000 |
| WO | 2000/025277 A1 | 5/2000 |
| WO | 2001/086599 A2 | 11/2001 |
| WO | 2002/033669 A1 | 4/2002 |
| WO | 2002/043020 A2 | 5/2002 |
| WO | 2002/082388 A1 | 10/2002 |
| WO | 2002/084548 A1 | 10/2002 |
| WO | 2003/044710 A1 | 5/2003 |
| WO | 2003/079259 A1 | 9/2003 |
| WO | 2004/023366 A1 | 3/2004 |
| WO | 2006/131708 A1 | 12/2006 |
| WO | 2017/053699 A1 | 3/2017 |
| WO | 2018/200730 A1 | 11/2018 |
| WO | 2018/200732 A1 | 11/2018 |

OTHER PUBLICATIONS

Non-Final Office Action dated Jul. 28, 2017, for U.S. Appl. No. 15/597,035, of Douthat, C., et al., filed May 16, 2017.

Final Office Action dated Jan. 12, 2018, for U.S. Appl. No. 15/597,035, of Douthat, C., et al., filed May 16, 2017.

Non-Final Office Action dated Apr. 16, 2018, for U.S. Appl. No. 15/620,642, of Maibach, M.H., et al., filed Jun. 12, 2017.

Notice of Allowance dated Jul. 18, 2018, for U.S. Appl. No. 15/597,035, of Douthat, C., et al., filed May 16, 2017.

Notice of Allowance dated Sep. 6, 2018, for U.S. Appl. No. 15/620,642, of Maibach, M.H., et al., filed Jun. 12, 2017.

Non-Final Office Action dated Sep. 7, 2018, for U.S. Appl. No. 15/582,174, of Douthat, C., et al., filed Apr. 28, 2017.

Final office Action dated Mar. 11, 2019, for U.S. Appl. No. 15/582,174, of Douthat, C., et al., filed Apr. 28, 2017.

Non-Final Office Action dated Jul. 25, 2019, for U.S. Appl. No. 15/599,826, of Dorsey, J., et al., filed May 19, 2017.

(56) References Cited

OTHER PUBLICATIONS

Non-Final Office Action dated Oct. 1, 2019, for U.S. Appl. No. 15/582,166, of Douthat, C., et al., filed Apr. 28, 2017.
Non-Final Office Action dated Jun. 15, 2020, for U.S. Appl. No. 15/836,753, of Binder, J. C., et al., filed Dec. 8, 2017.
Notice of Allowance dated Oct. 24, 2019, for U.S. Appl. No. 15/582,174, of Douthat, C., et al., filed Apr. 28, 2017.
Notice of Allowance dated Jan. 27, 2020, for U.S. Appl. No. 15/599,826, of Dorsey, J., et al., filed May 19, 2017.
Non-Final Office Action dated Jan. 27, 2020, for U.S. Appl. No. 15/836,713, of Douthat, C., et al., filed Dec. 8, 2017.
Notice of Allowance dated Mar. 25, 2020, for U.S. Appl. No. 15/582,166, of Douthat, C., et al., filed Apr. 28, 2017.
European Office Action for European Patent Application No. 18742856.0 dated Feb. 18, 2020.
Intention to Grant European Patent Application No. 18724079.1 dated May 20, 2020.
International Search Report and Written Opinion for International Application No. PCT/US2018/029451, dated Sep. 17, 2018.
International Search Report and Written Opinion for International Application No. PCT/US2018/029449, dated Jul. 31, 2018.
Final Office Action dated Aug. 21, 2020, for U.S. Appl. No. 15/836,713, of Douthat, C., et al., filed Dec. 8, 2017.
Spegele, Joseph Brain., "A Framework for Evaluating Application of Smart Cards and Related Technology Within the Department of Defense," Naval Postgraduate School, Jan. 1995.
Notice of Allowance dated Jan. 12, 2021, for U.S. Appl. No. 15/836,753, of Binder, J. C., et al., filed Dec. 8, 2017.
Examiner Requisition for Canadian Patent Application No. 3059051, dated Jan. 4, 2021.
English language translation of Office Action received in Japanese Patent Application No. 2019-554332 dated Jan. 5, 2021.
Advisory Action dated Nov. 4, 2020, for U.S. Appl. No. 15/836,753, of Binder, J. C., et al., filed Dec. 8, 2017.
Examiner Requisition for Canadian Patent Application No. 3059245, dated Nov. 12, 2020.
"Connection of Terminal Equipment to the Telephone Network," FCC 47 CFR Part 68, Retrieved from the URL: http://www.tscm.com/FCC47CFRpart68.pdf, on Sep. 24, 2019 Oct. 1, 1999 Edition.
"EMBEDDED FINancial transactional IC card READer," Retrieved from the URL: https://cordis.europa.eu/project/rcn/58338/factsheet/en.
Geethapriya Venkataramani and Srividya Gopalan., "Mobile phone based RFID architecture for secure electronic payments using RFID credit cards," 2007 IEEE, (ARES'07).
"Guideline for the Use of Advanced Authentication Technology," FIPS 190, Sep. 28, 1994.
"Identification cards—Recording technique—Part 4—Location of read-only magnetic tracks—Track 1 and 2," ISO/IEC 7811-4:1995, International Organization for Standardization, Aug. 1995.
Jerome Svigals., "The Long Life and Imminent Death of the Mag-stripe Card," IEEE Spectrum, vol. 49, Issue 61, Jun. 2012.
"Magensa's Decryption Services and MagTek's MagneSafe™ Bluetooth Readers Selected by eProcessing Network to Implement Secure Customer Card Data with Mobile Devices," Retrieved from the URL: https://www.magnensa.net/aboutus/articles/eProcessing - rev1.pdf Apr. 14, 2008.
Martha E. Haykin et al., "Smart Card Technology: New Methods for Computer Access Control," NIST Special Publication 500-157, Sep. 1988.
"MSP430x1xx Family User's Guide," (including 2016 correction sheet at 2), Texas Instruments Inc., 2006.
Notice of Allowance dated Dec. 10, 2020, for U.S. Appl. No. 15/836,753, of Binder, J. C., et al., filed Dec. 8, 2017.
English Language Translation of Notice of Reason for Refusal for Japanese Patent Application No. 2019-554368 dated Nov. 20, 2020.
Final Office Action dated Oct. 5, 2020, for U.S. Appl. No. 15/836,753, of Binder, J. C., et al., filed Dec. 8, 2017.
Office Action for European Patent Application No. 18724079.1 dated Sep. 29, 2020.
Office Action for European Patent Application No. 20177533.5 dated May 25, 2021.
English language translation of Decision to Grant for Japanese Patent Application No. 2019-554368 dated Jun. 25, 2021.
English language translation of Decision to Grant received in Japanese Patent Application No. 2019-554332 dated Jul. 2, 2021.
Notice of Allowance dated Sep. 27, 2021, for U.S. Appl. No. 15/836,713, of Douthat, C., et al., filed Dec. 8, 2017.
Summons to oral proceedings for European Patent Application No. 18724079.1 dated Feb. 7, 2022.
Non-Final Office Action dated Mar. 23, 2021, for U.S. Appl. No. 15/836,713, of Douthat, C., et al., filed Dec. 8, 2017.
Fujioka et al., "Security of Sequential Multiple Encryption", Progress in Cryptology—LATINCRYPT 2010, pp. 20-39 (Aug. 8, 2010) (Abstract Only).
English language translation of Notice of Reasons for Refusal for Japanese Patent Application No. 2021-114327 dated Aug. 5, 2022.
Examiner Requisition for Canadian Patent Application No. 3059245, dated Aug. 5, 2022.
Examiner Requisition for Canadian Patent Application No. 3059051, dated Oct. 20, 2021.
Summons to oral proceedings for European Patent Application No. 20177533.5 dated Oct. 25, 2021.
Examiner Requisition for Canadian Patent Application No. 3,059,245, dated Mar. 21, 2022.
English language translation of Decision to Grant for Japanese Patent Application No. 2021-114327, dated Oct. 3, 2022.

* cited by examiner

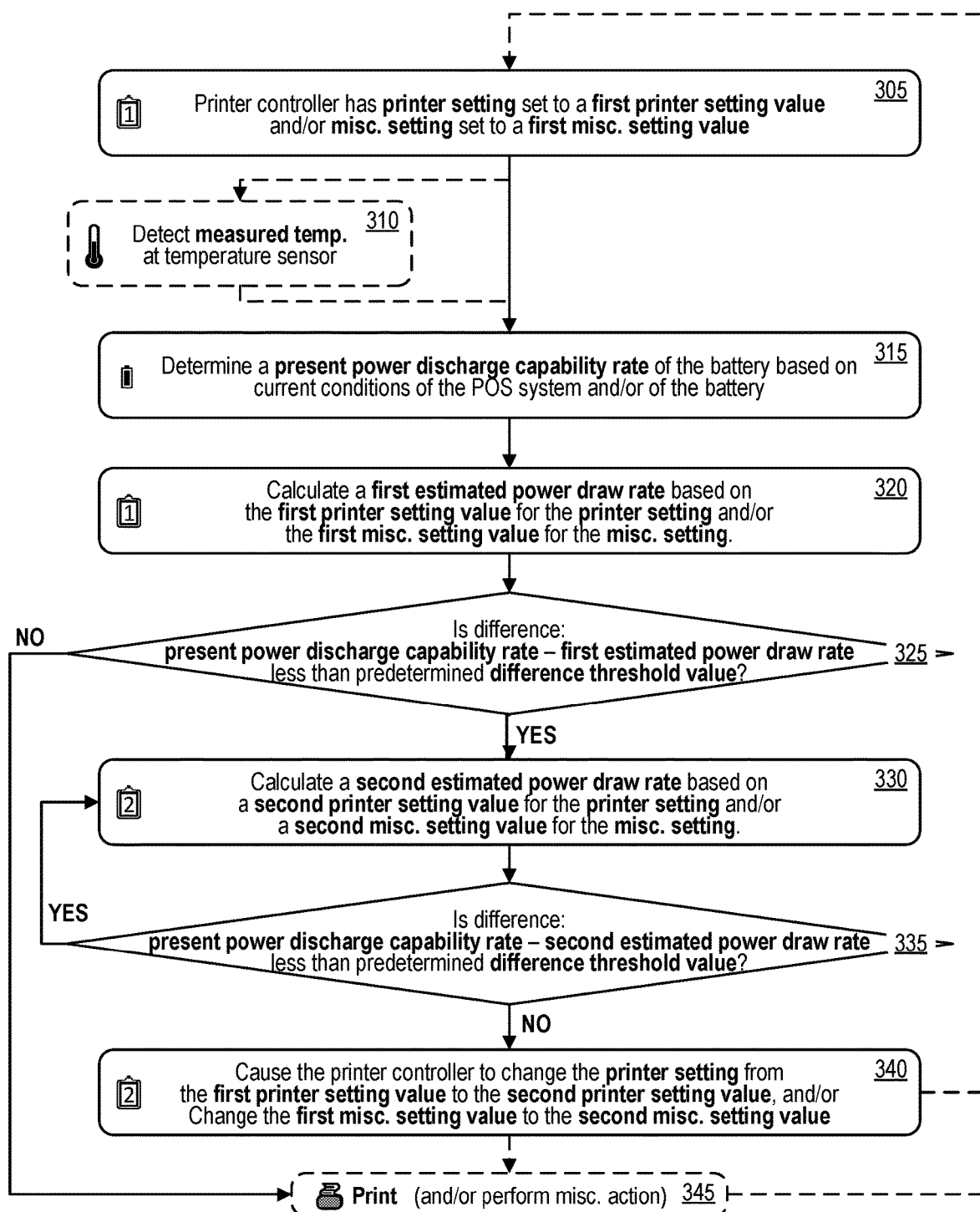

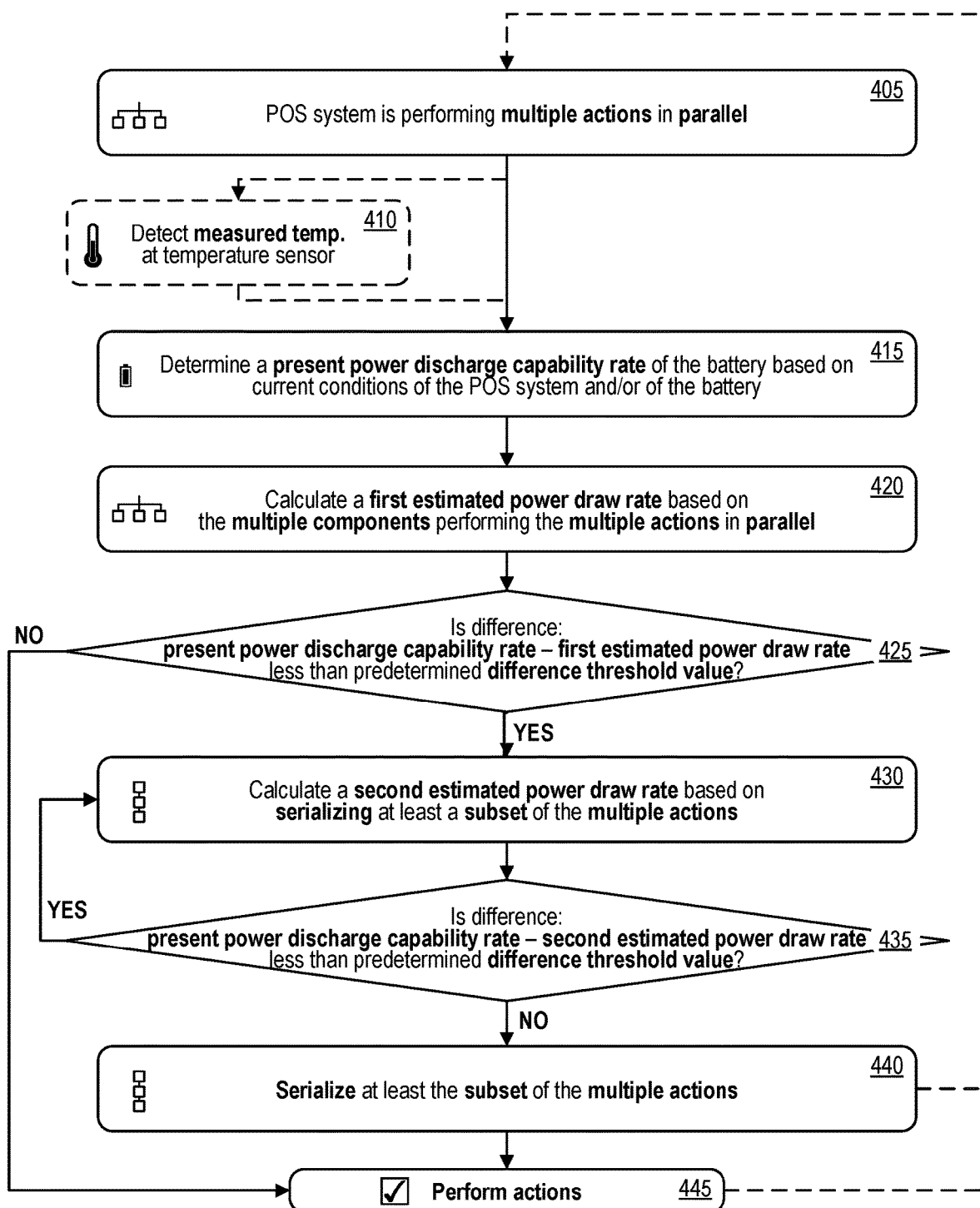

FIG. 5

| Printer Setting 505 | Possible Printer Setting Values 510 |
|---|---|
| Printer speed | Fast, medium, slow |
| Black darkness | Dark, medium, light |
| Print resolution | High, medium, low |
| Print quality | High, medium, low |
| Font thickness/boldness | Thick, medium, thin |
| Font size | Large, medium, small |
| Font | High power font, Medium power font, Low power font |
| Font spacing/tracking | Expanded, normal, condensed |
| Size of printed images | Large, medium, small, images disabled |
| Remove characters (shorthand) | Enabled, disabled |
| Printer power cycling | Enabled, disabled |
| Remove optional print content | Enabled (all), enabled (coupons), enabled (ads), disabled |
| Print pointer (QR code / link) | Enabled (pointer+), enabled (pointer only), disabled |
| Disable printer (email receipts) | Enabled, disabled |
| Print in parallel w other fxn | Enabled, disabled |
| Printed color spectrum | Full color, limited color, greyscale, monochrome/black |
| Print scale | 1% - 100% |
| Double sided print | Enabled, disabled |

FIG. 6

| Misc. Setting 605 | Possible Misc. Setting Values 610 |
|---|---|
| Processor clock speed | Fast, medium, slow |
| Max Processor cores used | 1-N |
| Maximum parallel processes | 1-N |
| Maximum parallel threads | 1-N |
| Maximum active components | 1-N |
| Processor GPU use | Enable (fully), Enable (limited), disable |
| NFC antenna poll rate | Fast, medium, slow |
| NFC antenna transfer speed | Fast, medium, slow |
| Wi-Fi antenna poll rate | Fast, medium, slow |
| Wi-Fi antenna transfer speed | Fast, medium, slow |
| Cellular antenna poll rate | Fast, medium, slow |
| Cellular antenna transfer speed | Fast, medium, slow |
| Bluetooth® antenna poll rate | Fast, medium, slow |
| Bluetooth® antenna tnsfr spd | Fast, medium, slow |
| Display screen brightness | Bright, medium, dim |
| Display screen backlight | Bright, medium, dim |
| Disable light sensor(s) | Enable, Disable |
| Touch surface poll rate | Fast (more sensitive), medium, slow (less sensitive) |
| Disable antenna while printing | Enable, Disable |
| Disable display while printing | Enable, Disable |
| Disable touch while printing | Enable, Disable |
| Pre-render receipt in cart | Enable, Disable |
| Disable unused antennae | Enable, Disable |
| Disable biometric sensor(s) | Enable, Disable |
| Disable temperature sensor(s) | Enable, Disable |
| Disable accelerometer/gyro(s) | Enable, Disable |
| Disable tamper detection | Enable, Disable |
| Disable indicator light | Enable, Disable |

POINT OF SALE DEVICE POWER MANAGEMENT AND UNDERVOLTAGE PROTECTION

CROSS-REFERENCE TO RELATED APPLICATIONS

This application is a continuation of U.S. application Ser. No. 15/582,166, filed Apr. 28, 2017, entitled "POINT OF SALE DEVICE POWER MANAGEMENT AND UNDERVOLTAGE PROTECTION" which is hereby incorporated by reference herein in its entirety.

BACKGROUND

A point of sale ("POS") device can include various components, such as a processor, a card reader, a network connection interface, and a receipt printer. Card readers are typically built to read transaction information from cards, such as credit cards or debit cards.

Printers allow text and other visual content to be printed onto paper via transfer of liquid ink, of solid toner, or thermal modification of paper. Printers typically include various moving parts and/or other high-energy components, such as lasers or thermal print heads. As such, printers are some of the most energy-hungry devices typically used in personal computing.

Portable devices are often powered by rechargeable or replaceable batteries with limits on their power discharge capability rates. That is, batteries are typically only able to discharge up to a certain amount of current, power, or voltage. When a battery or other power source is unable to supply enough power to the components it is connected to, this can cause various issues. These issues can include undervoltage, a situation where average voltage of powered components drops below intended or demanded levels, sometimes referred to as a brown-out. Undervoltages, or brownouts, can often result in powered components unable to perform the actions they are tasked with, and can sometimes result in permanent damage to the powered components. While large industrial machinery and municipal power grids can, in some cases, siphon energy from backup power sources when necessary, portable devices are typically limited to their respective batteries. POS devices facing brownouts can cause financial issues such as failed payments or double payments or security issues related to storage of sensitive data.

Low temperatures exacerbate situations where brownouts may already be a risk. Batteries are typically capable of outputting energy at higher rates when they are at higher temperatures, and are only capable of outputting energy at lower rates when they are at lower temperatures. At −20 degrees Celsius (−4 degrees Fahrenheit), most batteries stop functioning entirely. Some batteries can even suffer permanent damage at low temperatures, sometimes by developing permanent short circuits or by frozen electrolytes such as lead acid cracking battery enclosures. Likewise, printers often fail to function properly at lower temperatures, either due to an increase in ink viscosity, a decrease in laser/toner fusion efficacy, or a decrease in thermal print head efficacy. Printers include many moving parts, causing printers to often become fragile at lower temperatures as well.

Thus, there is a need in the art for improved power management and undervoltage protection in portable point of sale (POS) devices, particularly at low temperatures.

BRIEF DESCRIPTION OF THE DRAWINGS

FIG. 3 is a flow diagram illustrating undervoltage protection based on modification of printer settings.

FIG. 4 is a flow diagram illustrating undervoltage protection based on serialization of actions.

FIG. 5 is a chart illustrating multiple printer settings and corresponding possible printer setting values.

FIG. 6 is a chart illustrating multiple miscellaneous settings and corresponding possible miscellaneous setting values.

DETAILED DESCRIPTION

A point-of-sale (POS) device includes a processor, a battery, a transaction object reader, a printer with a printer controller, and optionally a temperature sensor. The processor determines a present power discharge capability rate of the battery, optionally based on a temperature measured by the temperature sensor. The processor also calculates a first estimated power draw rate based on a first setting value for at least one of the components of the POS device, such as the printer. If the first estimated power draw rate is dangerously close to the present power discharge capability rate of the battery, a second estimated power draw rate is calculated based on a second setting value for the one or more components. If the second estimated power draw rate is no longer dangerously close to the present power discharge capability rate of the battery, the components are set to the second settings value.

Figure 1:
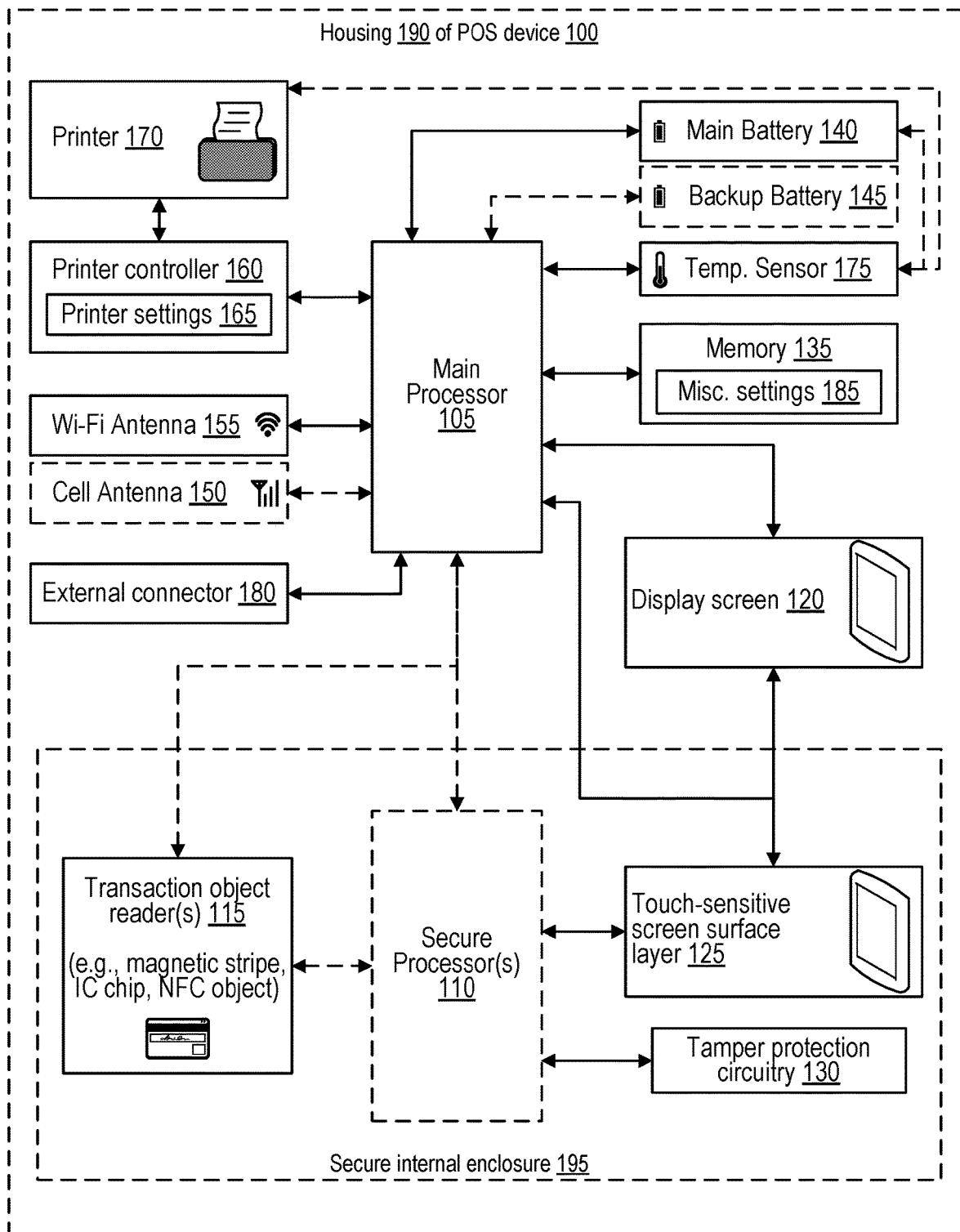
FIG. 1 is an architecture diagram of a point-of-sale (POS) device with power management.

FIG. 1 is an architecture diagram of a point-of-sale (POS) device with power management.

The architecture diagram of the POS device 100 of FIG. 1 includes a main processor 105 in a housing 190, and optionally one or more secure processor(s) 110 within a secure internal enclosure 195 within the housing 190. The main processor 105 may execute instructions to perform a variety of tasks, which may include communicating with the one or more secure processor(s) 110 as well as communicating with and/or controlling the various components coupled directly or indirectly to the main processor 105.

The main processor 105 is coupled to a main battery 140 and optionally a backup battery 145 in FIG. 1. In some cases, the main battery 140 may be rechargeable, while the backup battery 145 may be non-rechargeable. Ultimately, however, either or both of the batteries may be rechargeable or non-rechargeable. The main processor 105, main battery 140, and/or backup battery 145 may also be connected to a power connector (not pictured) that can be connected to an external battery (not pictured), an external generator (not pictured), or a power outlet (not pictured). The power connector can be used to recharge the main battery 140 and/or backup battery 145. The power connector can also be used to directly power the processor 105 and all other components of the POS device 100, even if both the main battery 140 and backup battery 145 are missing.

The main processor 105 is coupled to a printer 170 via a printer controller 160. The printer 170 may be used to print receipts, coupons, barcodes, quick-response ("QR") codes, or some combination thereof. The printer 170 may be a thermal printer, a direct thermal printer, a thermal transfer thermal printer, a solid-ink "phaser" printer, an inkjet printer, a thermal inkjet ("bubblejet") printer, a continuous inkjet printer, a piezoelectric inkjet printer, a dye-sublimation printer, a laser printer, an LED printer, or some combination thereof. The printer controller 160 may include a memory and/or a processor, microcontroller or ASIC (application specific integrated controller) with which it may adjust various printer setting values assigned to various printer settings 165 to control various aspects of the how the printer 170 prints. Various exemplary printer settings 165 and corresponding possible printer setting values are identified in FIG. 6. In some cases, the printer controller 160 need not be a separate component from the main processor 105, and the functions of the printer controller 160 may simply be performed by the main processor 105. In that light, it should be understood that any actions described herein as being performed by the printer controller 160 can alternately or additionally be performed by the main processor 105, and vice versa.

The main processor 105 is coupled to a temperature sensor 175 in FIG. 1. The temperature sensor may optionally include one or more thermistors, and may optionally be connected to the main battery 140 and/or to the printer 170. The temperature sensor may include one or more of a Negative Temperature Coefficient (NTC) thermistor, a Resistance Temperature Detector (RTD), a resistance thermometer, a thermocouple, an infrared sensor, a bimetallic device, a thermometer, a change-of-state sensor, a semiconductor-based temperature sensor, a silicon diode or other diode with temperature-sensitive voltage characteristics, or some combination thereof.

Figure 8:
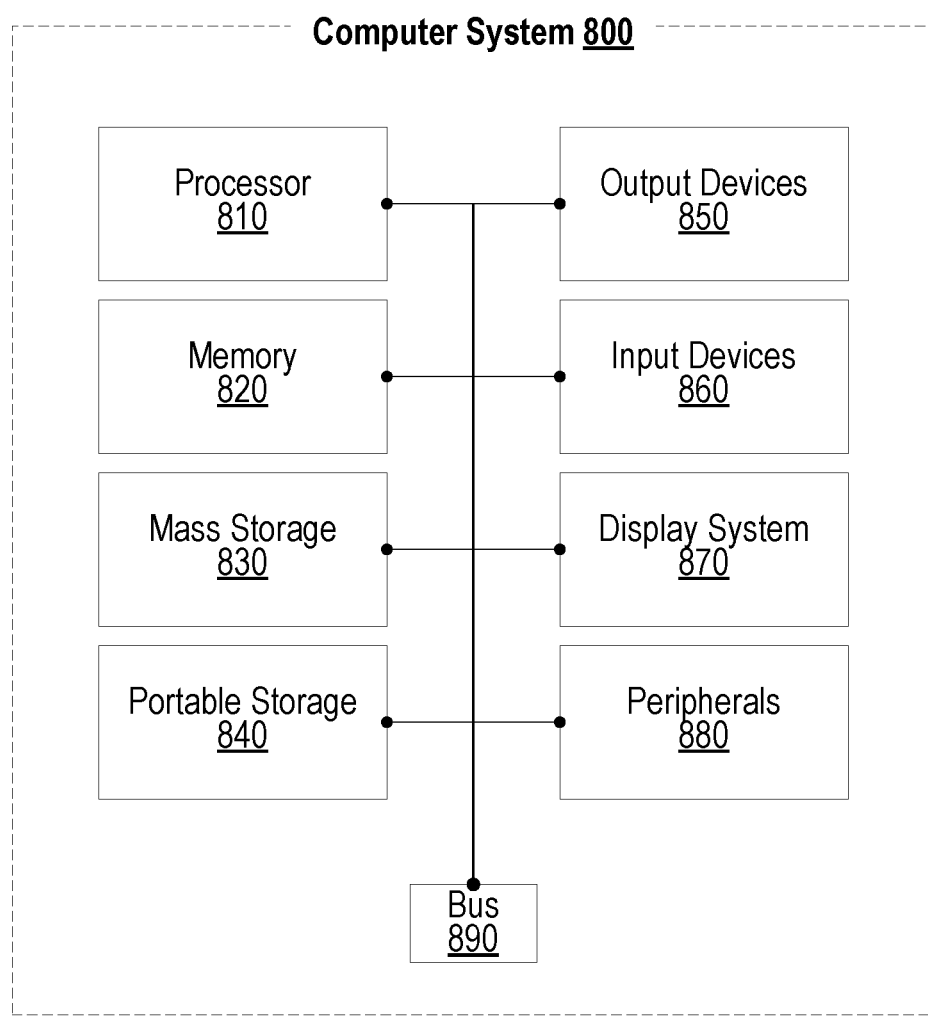
FIG. 8 is a block diagram of an exemplary computing device that may be used to implement an embodiment of the present invention.

The main processor 105 may be connected to one or more antennas, including an 802.11 Wi-Fi antenna 155, a cellular phone network antenna 150, a Bluetooth® antenna, a Bluetooth® Low Energy (BLE) antenna, any other antennae or communication means discussed with respect to the output devices 850 or input devices 860 of FIG. 8, or some combination thereof. The main processor 105 may alternately be connected to other means to networking, such as a wired Ethernet port.

The main processor 105 may be any type of processor 810 identified with respect to FIG. 8, and may be in some cases be part of, or include, an application-specific integrated circuit (ASIC). While the main processor 105 and secure processor(s) 110 are illustrated as separate components in FIG. 1, the main processor 105 and secure processor(s) 110 may in some cases be combined into a single component. It should be understood that any actions described herein as being performed by the secure processor(s) 110 can alternately or additionally be performed by the main processor 105, and that that any actions described herein as being performed by the main processor 105 can alternately or additionally be performed by the secure processor(s) 110.

The secure internal enclosure 195 can include tamper protection circuitry 130, such as tamper traces or grids running along one or more surfaces of the secure internal enclosure, allowing the secure processor(s) 110 to detect attempts to tamper with the secure internal enclosure 195 or any components within. For example, tamper protection circuitry 130 can detect attempts to open the secure internal enclosure 195, to drill into the secure internal enclosure 195, to modify the secure internal enclosure 195, or to flood the secure internal enclosure 195 with conductive ink or other fluid. The tamper protection circuitry 130 can do this by measuring voltages at one or more points along a circuit connected to the tamper traces or grids running along the surface(s) of the secure internal enclosure 195, allowing the tamper protection circuitry 130 to detect short circuits, breaks in the circuit, or other changes in voltage outside of ordinary threshold levels, which would typically indicate a tampering attempt. Detection of a tamper attempt could be used by the secure processor(s) 110 or main processor 105 to disable at least a subset of the functions or components of the POS device 100.

The secure internal enclosure 195 and its included tamper protection circuitry 130 can be used to protect any circuitry that reads, stores, or otherwise conveys sensitive information, such as credit or debit card numbers, near field communication (NFC) signal data from a NFC object conveying transaction information, bank account information, other transaction information, biometric information, identity information, Personal Identification Number (PIN) codes, handwritten signature scans, handwritten signatures entered via touch-sensitive surface, digital certificate signatures, symmetric keys, asymmetric public/private keys, and so forth.

Because information entered via a touch-sensitive screen surface layer 125 of a touchscreen 210 may include sensitive information, such as PIN codes or handwritten signatures entered via touch-sensitive surface, circuitry reading inputs of the touch-sensitive surface may in some cases be housed in the secure internal enclosure 195, while the circuitry of the display screen 120 of the touchscreen 210 might not be. Likewise, the POS device 100 may include other input devices 860 as discussed with respect to FIG. 8, such as physical keypads, whose circuitry might also be located in the secure internal enclosure 195 for the same reasons. The touch-sensitive screen surface layer 125 may use any type of display discussed in reference to the display system 870 of FIG. 8, and may use capacitive touch sensing, resistive touch sensing, inductive touch sensing, or some combination thereof. For example, the touch-sensitive screen surface layer 125 may utilize a Indium Tin Oxide (ITO) touch-sensitive layer or a printed ink touch-sensitive layer.

The secure processor(s) 110 are also connected to one or more transaction object reader(s) 115. The transaction object reader(s) 115 may include a magnetic stripe reader 235, an integrated circuit (IC) chip reader 225, a near field communication (NFC) reader, or some combination thereof. The magnetic stripe reader 235 reads transaction data from a magnetic stripe of a transaction object. The IC chip reader 225 reads transaction data from an IC chip of a transaction object. The IC chip may be a chip following Europay/Mastercard/Visa ("EMV") standards, also known as an EMV chip. The NFC reader reads transaction data from wireless NFC signals received from a transaction object. The transaction object may be a transaction card, such as a credit card or a debit card. The transaction object may be any type of NFC-capable device, such as an active NFC tag, a passive NFC tag, or a computer system 500 as described with respect to FIG. 5. In some cases, multiple transaction object readers 115 may share components—for example, the IC chip reader 225 and the NFC reader may share a contactless antenna. Once the transaction object reader(s) 115 retrieve the transaction data from the transaction object, the transaction object reader(s) 115 send the transaction data to the secure processor(s) 110 and/or main processor 105. The transaction object reader(s) 115 or secure processor(s) 110 sometimes modify or encrypt the transaction data using an encryption key stored in a memory (not pictured) associated with the transaction object reader(s) 115 and/or secure processor(s) 110 before sending it to the main processor 105.

The main processor 105 may also be connected to a memory 135 that stores various instructions to be executed by the main processor, such as instructions corresponding to a financial transaction software application allowing the main processor 105 to receive transaction data read by the transaction object reader(s) 115, optionally via the secure processor(s) 110, and to transmit that data to one or more financial transaction processing server(s), such as credit or debit card processing server(s) and/or bank server(s), thereby conducting a financial transaction between a merchant and a buyer whose transaction information was read via the transaction object reader(s) 115. The memory 135 may also store the printer settings 165 additionally or alternatively from the printer controller 160. The memory 135 may also store miscellaneous settings 185 pertaining to the main processor 105, the display screen 120, the touch-sensitive screen surface layer 125, the Wi-Fi antenna 155, the cellular antenna 150, and/or various other components. Various exemplary miscellaneous settings 185 and corresponding possible miscellaneous setting values are identified in FIG. 7.

The main processor 105 may also be connected to at least one external connector 180, which may be an externally-facing female port or male plug that may allow the POS device 110 to connect to other devices or power sources. In some cases, the external connector 180 may allow the POS device 100 to connect to any other computer system 800, or to any device including at least a subset of the components identified in FIG. 8 or discussed in its description. The POS device 100 may be connected to one or more peripheral devices or hubs via the at least one external connector 180. The POS device 100 may in some cases act as a peripheral device to a host device connected via the at least one external connector 180. In some cases, the external connector 180 may function as the power connector discussed above with respect to the batteries 140/145 and/or external power sources. In some cases, the external connector 180 may be a universal serial bus (USB) port/plug using any USB standard, including USB Type-A, USB Type-B, USB Type-C, USB 1.x, USB 2.x, USB 3.x, USB 4.x, Thunderbolt, USB mini, USB micro, USB On-The-Go (OTG), any other USB standard, or some combination thereof. In other cases, the external connector 180 may be an Apple® Lightning® port/plug, an Ethernet port/plug, a fiber optic port/plug, a proprietary wired port/plug. In other cases, the external connector 180 may be a wireless transceiver, such as one supporting a BLUETOOTH® wireless signal transfer, a BLUETOOTH® low energy (BLE) wireless signal transfer, a radio-frequency identification (RFID) wireless signal transfer, near-field communications (NFC) wireless signal transfer, 802.11 Wi-Fi wireless signal transfer, cellular data network wireless signal transfer, a radio wave signal transfer, a microwave signal transfer, an infrared signal transfer, a visible light signal transfer, an ultraviolet signal transfer, a wireless signal transfer along the electromagnetic spectrum, or some combination thereof.

The POS device 100 may also include various additional or alternative elements connected to the main processor 105 and/or the secure processor(s) 110, each of which may optionally be located in the secure internal enclosure 195. Such additional or alternative elements may include microphones. The additional or alternative elements may include cameras, such as visible light cameras, infrared cameras, ultraviolet cameras, night vision cameras, or even ambient light sensors. Ambient light sensors may optionally be coupled to the main processor 105 and/or the display screen 120 to control brightness of the display screen 120 and/or of a backlight of the display screen 120 in order to acclimatize to the ambient light level around the POS device 100 and prevent the display screen 120 from appearing too bright/harsh or too dim/unclear. The additional or alternative elements may include biometric sensors, such as fingerprint scanners, handprint scanners, voice authentication, facial recognition or iris scanners (using any of the camera types discussed above), blood testers, DNA testers, or some combination thereof. The processor(s) 105/110 may compare received biometric data from the buyer via the biometric sensors against databases stored within the memory 135 or accessible to the POS device 100 via a network connection via the Internet or a private network. The additional or alternative elements may include one or more accelerometer(s) and/or one or more gyroscope(s), allowing the processor(s) 105/110 of the POS device 100 to react to being tilted, moved, or shaken, optionally as indications of tampering via the tamper protection circuitry 130 if the POS device 100 is intended to be stationary. The additional or alternative elements may include one or more indicator lights, which may be light-emitting diodes (LED) and may emit light, optionally at varying brightnesses and/or colors, to indicate a successful transaction, to indicate a failed transaction, to indicate that a card or other transaction object should be presented/inserted/swiped, to indicate that a card or other transaction object should be removed, to indicate that a user input such as a PIN code must be input via the touch-sensitive display screen 210, to indicate that an input via the touch-sensitive display screen 210 has been received, to indicate successful connection via any of the antennae of the POS system 100, to indicate failure to connect via any of the antennae of the POS system 100, to indicate a signal strength associated with any of the antennae of the POS system 100, or some combination thereof. The additional or alternative elements may include any components illustrated in FIG. 8 or discussed in the description of FIG. 8.

Figure 2:
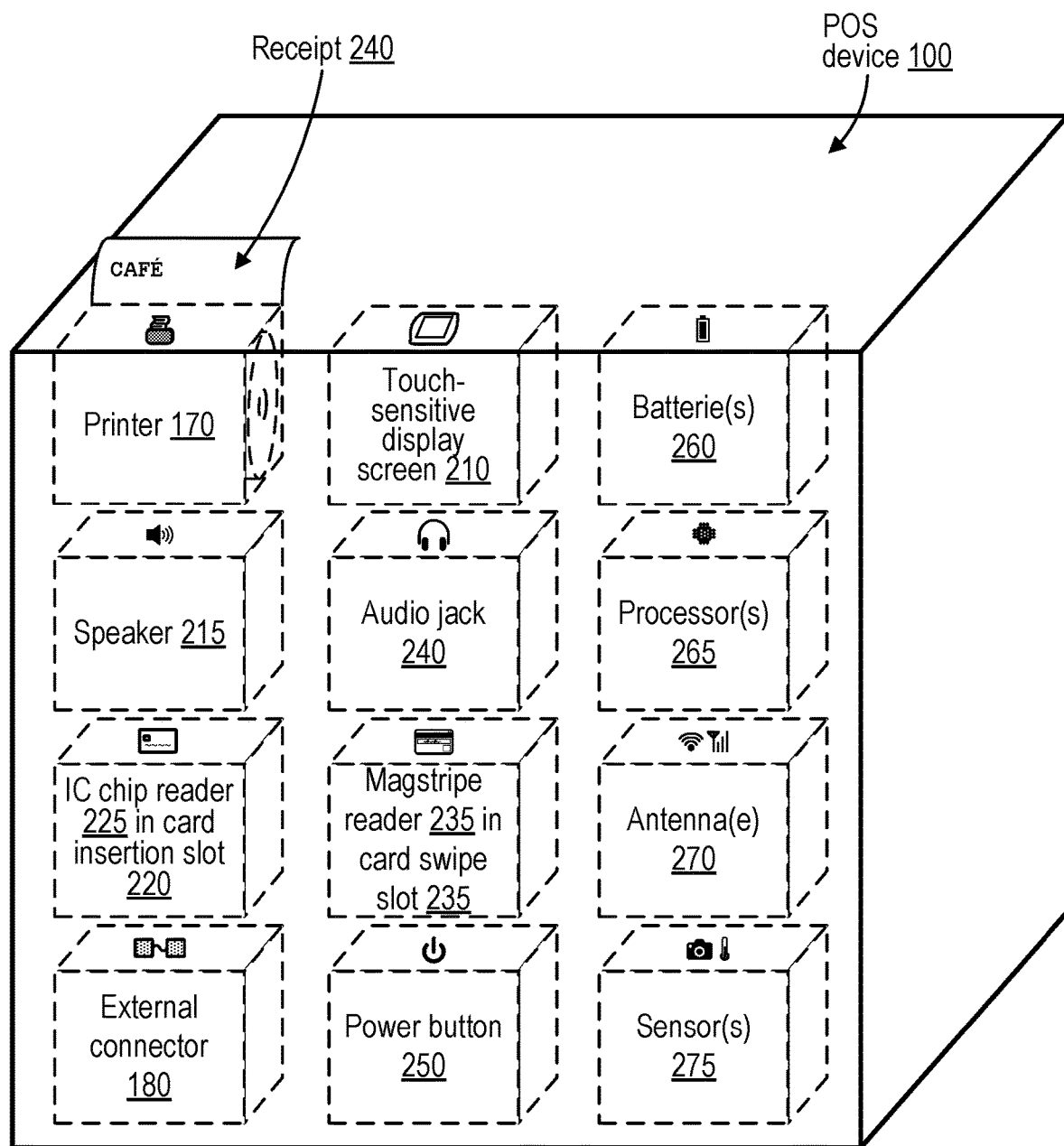
FIG. 2 is a perspective view of a point-of-sale (POS) device.

FIG. 2 is a perspective view of a point-of-sale (POS) device.

The POS device 100 of FIG. 2 may include at least a subset of the architecture and components illustrated in FIG. 1 or discussed with respect to FIG. 1, and optionally may include a subset of the architecture and components illustrated in FIG. 8 or discussed with respect to FIG. 8.

The POS device 100 of FIG. 2 may include one or more batteries 260, which may include one or more rechargeable batteries, one or more non-rechargeable batteries, or some combination thereof. In some cases, one battery may act as a "main" battery, while another acts as a "backup" battery and serves to provide power to complete a transaction that was started using power from the main battery if the main battery becomes depleted or stops working due to a disconnected/poor electrical connection, a short circuit, or a battery defect. The one or more batteries 260 include the main battery 140 and optionally the backup battery 145 of FIG. 1.

Two transaction object readers 115 and corresponding card slot interfaces are depicted in the POS device 100 of FIG. 2. In particular, a card insertion slot 220 is illustrated allowing insertion of an IC chip card having an IC chip, such as an EMV chip. Transaction information is read from this IC chip by the IC chip reader 225 and then transmitted on to the main processor 105 and/or secure processor(s) 110, optionally being encrypted at the transaction object (the IC chip card), at the IC chip reader 225, at the secure processor(s) 110, at the main processor 105, or some combination thereof. A card swipe slot 230 is depicted, through which a magnetic stripe card having a magnetic stripe may be swiped. In some cases one or more "swiper walls" may be included along the sides of the card swipe slot 230 to keep the card in the card swipe slot 230 during the duration of the swipe. Transaction information is read from this magnetic stripe by the magnetic stripe reader 235 and then transmitted on to the main processor 105 and/or secure processor(s) 110, optionally being encrypted at the transaction object (the IC chip card), at the IC chip reader 225, at the secure processor(s) 110, at the main processor 105, or some combination thereof. An NFC antenna may also be included within or connected to the POS device 100, though it is not shown. Transaction information is read from an NFC-capable object by the NFC antenna and then transmitted on to the main processor 105 and/or secure processor(s) 110, optionally being encrypted at the transaction object (the IC chip card), at the IC chip reader 225, at the secure processor(s) 110, at the main processor 105, or some combination thereof. In some cases, the NFC antenna and the IC chip reader 225 may share a contactless antenna.

The POS device 100 of FIG. 2 may include one or more processor(s) 265, including one or more main processor(s) 105 and one or more secure processor(s) 110 as depicted in FIG. 1. Each of the one or more processor(s) 265 may be any type of processor 510 discussed with respect to FIG. 5. Each of the one or more processor(s) 265 may be connected to its own memory 820, mass storage 830, portable storage 840, output devices 850, input devices 560, or any other component discussed with respect to FIG. 8; alternately, some of the one or more processor(s) 265 may share such components.

The main processor(s) 105 and the one or more secure processor(s) 110 may be divided to distribute different processes or control of different components to different processors. For example, the secure processor(s) 110 may be connected to the transaction object reader(s) 115, where the secure processor(s) 110 handle encryption of the transaction information before that transaction information reaches the main processor 105. These secure processor(s) 110, along with components of the transaction object reader(s) 115, may be housed in a secure internal enclosure 195 within the POS device 100 (not shown in FIG. 2), where the secure internal enclosure 195 includes tamper detection circuitry that may be connected to the secure processor(s) 110 and/or to the main processor 105. The tamper detection circuitry may include multiple voltage sensors within a tamper detection circuit that includes conductive tamper traces lining one or more surfaces of the secure internal enclosure 195, so that any break in the tamper traces, or any short circuit caused by connecting two tamper traces, can be detected. In this way, the tamper detection circuit, and therefore the one or more processor(s) 265, can detect if someone has attempted to tamper with the secure internal enclosure 195, for example by attempting to open the secure internal enclosure 195, by drilling into a side of the secure internal enclosure 195, by attempting to damage or disable the secure internal enclosure 195, or by flooding the secure internal enclosure 195 with a conductive fluid. Some input components that may receive sensitive information such as Personal Identification Number (PIN) codes, signatures, or biometric data may also be enclosed in the secure internal enclosure 195, as may be any memory or data storage components that store symmetric or asymmetric encryption/decryption security keys for encrypting and/or decrypting transaction information. These input components may include touch-sensitive screen surface layer 125 and related components of the touch-sensitive display screen 210, biometric sensors, or a physical keypad.

It should be understood that any operation discussed herein as being performed by the main processor 105 can alternately or additionally be performed by any combination of the one or more processor(s) 265, such as the secure processor(s) 110 discussed above.

A touch-sensitive display screen 210 is illustrated as a component of the POS device 100, and may be secured to the POS device 100 so that it represents at least a portion of a face of the POS device 100. For example, the touch-sensitive display screen 210 may be on a top or front face of the POS device 100. The touch-sensitive display screen 210 may be on a diagonally angled face that is angled so as to be more easily viewed by a buyer user or merchant user of the POS system 100. The touch-sensitive display screen 210 may be curved and may be on a curved face that is angled so as to be more easily viewed by a buyer user or merchant user of the POS system 100. In some cases, the touch-sensitive display screen 210 may be mounted to the POS system 100 in such a way that the angle of the display with respect to a housing for the rest of the POS device 100 may be adjusted by a buyer user or merchant user of the POS system 100, for example allowing swiveling along one or two rotation axes. The touch-sensitive display screen 210 may also optionally be mounted to the POS system 100 in such a way as to allow rotation of the touch-sensitive display screen 210 as well, for example to rotate from a portrait mode to a landscape mode or vice versa, or to rotate from a merchant-facing orientation to a buyer-facing orientation. The touch-sensitive display screen 210 is made up of the display screen 120 and touch-sensitive screen surface layer 125 illustrated in FIG. 1 and is connected to the main processor 105 and/or to the secure processor(s) 110 as illustrated in FIG. 1 and discussed with respect to the display screen 120 and touch-sensitive screen surface layer 125 of FIG. 1.

The touch-sensitive display screen 210 may display, for example, a user interface of a financial transaction application run via the processor 105 by executing financial transaction application instructions stored in a memory of the POS device 100. The user interface may in some cases include an "add to cart" interface allowing the buyer or merchant to input cart information identifying which items are being purchased by the buyer. The main processor 105 renders receipt data corresponding to a receipt 240 to be printed by the printer 170 based on the cart information, and in some cases does so in real-time as items are being added to the cart in order to reduce power usage by the main processor 105 during or near printing time, thereby avoiding exacerbating spikes in power usage during and around printing. Receipt data rendering may be performed by a central processing unit (CPU) of the main processor 105, a graphics processing unit (GPU) of the main processor 105, or some combination thereof. In some cases, the touch-sensitive display screen 210 can display a visualization or preview of the receipt data to be printed as the receipt 240 by the printer 170. The touch-sensitive display screen 210 may use any type of display discussed in reference to the display system 870 of FIG. 8, and may use capacitive touch sensing, resistive touch sensing, inductive touch sensing, or some combination thereof. For example, the touch-sensitive display screen 210 may utilize a Indium Tin Oxide (ITO) touch-sensitive layer or a printed ink touch-sensitive layer.

A receipt 240 is illustrated being output of a top-rear edge of the POS device 100. This receipt 240 is output by a printer 170 illustrated FIG. 2 according to printer settings 165 in the printer controller 160 (not shown in FIG. 2).

The POS device 100 also includes a speaker 215 for outputting audio. Such audio can be associated with the financial transaction application, and can for example be output to indicate a successful transaction, to indicate a failed transaction, to indicate that a card or other transaction object should be presented/inserted/swiped, to indicate that a card or other transaction object should be removed, to indicate that a user input such as a PIN code must be input via the touch-sensitive display screen 210, to indicate that an input via the touch-sensitive display screen 210 has been received, to indicate successful connection via any of the antennae of the POS system 100, to indicate failure to connect via any of the antennae of the POS system 100, to indicate a signal strength associated with any of the antennae of the POS system 100, or some combination thereof.

The perspective view of the POS device 100 illustrates the printer 170 in the POS device 105, where the printer 170 is printing the receipt 240. A roll of paper is visible through an side face of the printer 170 in FIG. 2. The paper may be thermal paper, contact paper, photo paper, or other specialized paper as required by the printer 170. In some cases, one or more face(s) of the POS device 100 may include doors (not shown) that open and close, for example enabling paper, ink, and/or toner to be easily replaced in the printer 180, or enabling one or more batterie(s) 260 to be easily replaced.

The perspective view of the POS device 100 also shows an external connector 180, which in FIG. 2 is illustrated as a USB type-C port. The POS device 100 may also or alternatively include at least one of a Bluetooth®, Bluetooth® Low Energy (BLE), or Wi-Fi antenna internally to serve as external connectors 180.

The perspective view of the POS device 100 also shows an audio jack 240. The audio jack 240 may allow headphones or external speakers to be plugged into the POS device 100 to provide an alternative or additional audio output device to output the audio that the speakers 215 can output. Other peripherals, such as card readers or NFC readers, may alternatively be connected via the audio jack 240. The audio jack 240 may in some cases act as an external connector 180.

The POS device 100 may also include a power button 250 that can be used to whether or not power is conveyed to the processor 105, the touch-sensitive display screen 210, the transaction object reader(s) 115, and/or other elements of the POS device 100. The POS device 100 may be powered by the batterie(s) 260 discussed above, a connection to a power outlet, or some combination thereof. The connection to the power outlet or other power source may be made through the external connector 180, the audio jack 240, a separate power port (not illustrated), or some combination thereof, and may charge the batterie(s) 260 and/or power at least a subset of the components of the POS device 100.

The POS device 100 may include one or more wireless antennae 270, which may include the Wi-Fi antenna 155 and the cellular network antenna 165 illustrated in FIG. 1. The one or more wireless antennae 270 may additionally or alternatively include, for example, a 802.11 Wi-Fi antenna, a Bluetooth® antenna, a Bluetooth® Low Energy (BLE) antenna, a cellular network antenna, a NFC antenna, a radio frequency identification (RFID) antenna, an antenna for any other type of communication discussed with respect to FIG. 8, or some combination thereof.

The POS device 100 may include one or more sensors 275, whose measurements may be fed into the main processor 105 or any other processor(s) 265. The sensors 275 may include the temperature sensor 175 of FIG. 1 for detecting high temperatures, which may indicate overheating and/or for detecting low temperatures, which may increase undervoltage risk, since batteries often do not function as well in low temperatures. The sensors 275 may include a camera (visible, infrared, ultraviolet, or some combination thereof) or ambient light sensor, which may for example be used to adjust the brightness and/or backlight brightness of the display screen 120 of the touch-sensitive display screen 210 to match its surroundings, so that brightness is increased where surroundings are bright to improve visibility, and so that brightness is decreased where surroundings are dim to avoid eyestrain. The sensors 275 may include biometric sensors, such as fingerprint scanners, palm scanners, iris/facial recognition detection (using one or more cameras), voiceprint recognition (using one or more microphones), blood sensors, DNA sensors, or some combination thereof. Data from biometric sensors may be encrypted along with transaction information or separately, and may be verified (by the POS device 100 or by a remote server) against a database stored at the POS device 100 or at another device remote from the POS device 100.

The POS device 100 may in some cases include additional ports or components not shown in the figures, such as an Ethernet port for wired networking capabilities, a SIM card slot and cellular antenna for cellular networking capabilities, or any other component illustrated in FIG. 8 or identified in the description of FIG. 8.

FIG. 3 is a flow diagram illustrating undervoltage protection based on modification of printer settings.

At step 305, the printer controller 160 has a particular printer setting associated with the printer 170 set to a first printer setting value. Alternately or additionally, the main processor 105 has a particular miscellaneous setting set to a first miscellaneous setting value. The printer setting may be one of multiple printer settings 165 controllable by the printer controller 160. The miscellaneous setting may be one of multiple miscellaneous settings 185 controllable by the main processor 105 and stored in memory 135. Examples 505 of printer settings 165 and possible corresponding printer setting values 510 are provided in FIG. 5. Examples 605 of miscellaneous settings 185 and possible corresponding miscellaneous setting values 610 are provided in FIG. 6.

At optional step 310, a measured temperature is detected at the temperature sensor 175 and provided to the main processor 105.

At step 315, the main processor 105 determines a present power discharge capability rate of the battery based on current conditions of the POS system 100 and/or of the battery 140. These current conditions may include factors such as load associated with the components of the POS device 100, the setting values of the printer settings 165 and miscellaneous settings 185, voltage sensor measurements from voltage sensors within the POS device 100, the model of the particular battery 140 used, technical specifications of the particular battery 140 used, condition metrics of the particular battery 140 used, the measured temperature measured at the temperature sensor 175 in optional step 310, or some combination thereof. Battery technical specifications can include nominal voltage, cut-off voltage, capacity, nominal capacity, energy, nominal energy, cycle life, specific energy, specific power, energy density, power density, maximum continuous discharge current, maximum 30-sec discharge pulse current, charge voltage, float voltage, recommended charge current, maximum internal resistance, or some combination thereof. Condition metrics of the particular battery 140 can include state of charge, depth of discharge, battery cycle life, battery cycle count, terminal voltage, open-circuit voltage, internal resistance, or some combination thereof. The present power discharge capability rate can correspond to a given point or stretch of time in the present and/or near future, and can sometimes be an amount rather than a rate.

The present power discharge capability rate may be calculated by the main processor 105 based a combination of the factors identified above, for example using the Peukert's equation. The present power discharge capability rate, or some element of the calculation used in the Peukert's equation or another calculation, may be determined based on the main processor 105 querying a battery data structure, such as a battery lookup table or battery database, for this information. The battery data structure may be stored in memory 135/820, mass storage 830 within the POS system 100 or outside of it, or a network-accessible source on the Internet or a private network. The battery lookup table or battery database can take the measured temperature and/or any of the other factors discussed above as a query for the battery data structure. The battery data structure can then return an estimated present power discharge capability rate or some variable that can be used by the main processor 105 to calculate the present power discharge capability rate given the other information available to the main processor 105.

At step 320, the main processor 105 calculates a first estimated power draw rate based on the first printer setting value for the printer setting identified in step 305 and/or the first miscellaneous setting value for the miscellaneous setting identified in step 305. The first estimated power draw rate can correspond to the given point or stretch of time in the present and/or near future, and can sometimes be an amount rather than a rate. The first estimated power draw rate can be based solely on the printer 170 due to its outsized influence on power draw, can be based solely on another high-draw component such as the touch-sensitive display screen 210, or can be based on a sum power draw rate of a combination of components (optionally all of the components) of the POS device 100 estimated to be drawing power from the battery 140 of the POS device 100 currently and/or in the near future within a predetermined amount of time. This can also be based on any settings values set in the miscellaneous settings 185, for which examples are given in FIG. 7. Calculation of the first estimated power draw rate may also be based on the measured temperature measured at the temperature sensor 175 in optional step 310 in situations where temperature may affect power draw in predictable ways. The main processor 105 can use any combination of the factors identified with respect to step 315 in calculating the first estimated power draw rate based on as well.

Calculation of the first estimated power draw for the printer in particular can be accomplished a number of ways. Calculation of the first estimated power draw for the printer can be based on the cart information discussed with respect to the touch-sensitive display screen 210 regarding FIG. 2. The cart information can be used to render the receipt before printing, identifying exactly how many of which characters will be in the receipt and at which lines of the receipt paper, and identifying any images/graphics to be printed on the receipt and at what size. An energy draw estimate may be provided based on printing of each character based on a lookup data structure that identified how much energy the printer 170 needs to print any given character identified in a query. Alternately, energy draw estimate may be provided based on printing of each character based on an estimated average energy draw for printing of any character. Alternately, energy draw estimate may be provided based on printing of each character based on an estimated maximum energy draw for printing of any character, that is, of printing a completely black box character. The energy draw estimate can be generated line-by-line or for the entire receipt in this manner, using either the chart information and energy draw estimates for the specific characters therein, average line or page energy draws, or maximum line or page energy draws (i.e., for a fully black line or page).

Figure 7:
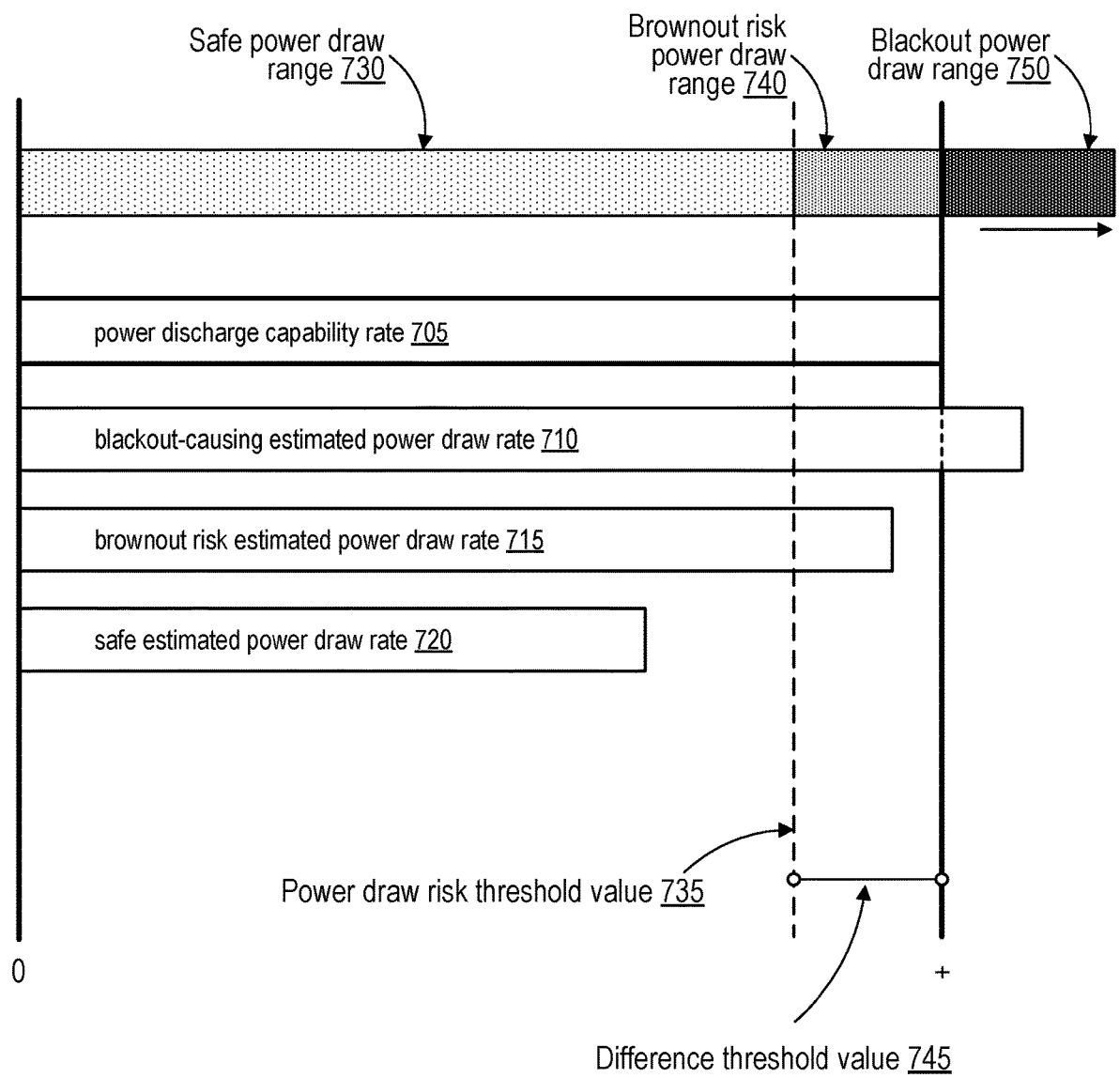
FIG. 7 is a bar chart comparing a power discharge capability rate to risk and safe power draw rates.

At step 325, the main processor 105 calculates a difference between the present power discharge capability rate and the first estimated power draw rate at the given point or stretch of time in the present and/or near future, and determines whether or not that difference is less than a predetermined difference threshold value 745 as illustrated in FIG. 7. If the first estimated power draw rate is greater than the present power discharge capability rate, then the first estimated power draw rate is in the blackout power draw range 750, and the difference is negative and necessarily less than the positive difference threshold value 745. If the first estimated power draw rate is less than the present power discharge capability rate but by a difference that is less than the difference threshold value 745, then the first estimated power draw rate is in the brownout risk power draw range 740. If the first estimated power draw rate is less than the present power discharge capability rate by a difference that is greater than the difference threshold value 745, then the first estimated power draw rate is in the safe power draw range 730 and needs no changes. Thus, if the difference between the present power discharge capability rate and the first estimated power draw rate is greater than the predetermined difference threshold value 745, then the first estimated power draw rate is within the safe power draw range 730, no changes are needed, and step 345 is next. Otherwise, step 330 is next.

At step 330, the main processor 105 selects a second printer setting value for the printer setting and/or a second miscellaneous setting value for the miscellaneous setting. The second printer setting value should be different from the first printer setting value, and if the process has returned to step 330 after a "no" at step 335, also different from any other second printer setting value already tried. Likewise, the second miscellaneous setting value should be different from the first printer setting value, and if the process has returned to step 330 after a "no" at step 335, also different from any other second miscellaneous setting value already tried.

Also at step 330, the main processor 105 also calculates a second estimated power draw rate based on the second printer setting value for the printer setting identified in step 305 and/or the first miscellaneous setting value for the miscellaneous setting identified in step 305. The second estimated power draw rate corresponds to the given point or stretch of time in the present and/or near future, and can represent an amount rather than a rate. This is done in much the same way, or in a similar way, as how that main processor 105 calculated the first estimated power draw rate in step 320 based on the first printer setting value and/or the second miscellaneous setting value.

At step 335, the main processor 105 calculates a difference between the present power discharge capability rate and the second estimated power draw rate at the given point or stretch of time in the present and/or near future, and determines whether or not that difference is less than the predetermined difference threshold value 745 as illustrated in FIG. 7. This is done in the way, or a similar way, to the difference calculation and comparison to the predetermined difference threshold value 745 of step 325. If the difference between the present power discharge capability rate and the second estimated power draw rate is still less than the predetermined difference threshold value 745, then the main processor 105 can go back to step 330 and try again with a new second printer setting value that is different from the current second printer setting value. If there are no new second printer setting values left to try for that printer setting, or if there are no new second miscellaneous setting values left to try for that miscellaneous setting, then the main processor 105 can go back to step 305 and try again with a different printer setting and/or miscellaneous setting. The main processor 105 may alternatively or additionally try changing setting values for multiple printer settings and/or miscellaneous settings simultaneously, or may go to step 405 of FIG. 4 to attempt serialization of actions, or may issue a warning to the user that it the POS device 100 is about to shut down due to otherwise unavoidable brownout/blackout risk. If the difference between the present power discharge capability rate and the second estimated power draw rate is greater than the predetermined difference threshold value 745, then the second estimated power draw rate is in the safe power draw range 730, no further changes are needed, and step 340 is next.

At step 340, the main processor 105 causes the printer controller 160 to change the printer setting identified in step 305 from the first printer setting value to the second printer setting value. Alternately or additionally, the main processor 105 changes the miscellaneous setting identified in step 305 from the first miscellaneous setting value to the second miscellaneous setting value. At this point, the second estimated power draw rate should be within the safe power draw range 730 and the POS device 100 can be permitted to continued operations.

At step 345, the main processor 105 indicates to the printer controller 160 that the printer 170 can go ahead and print using the printer setting value(s) for the printer settings 165 established during the process of FIG. 3, and/or using miscellaneous setting value(s) for the miscellaneous settings 185 established during the process of FIG. 3. Because the process of FIG. 3 can apply to other actions besides printing, a different action by a different component can be performed at step 345 instead, but again, using the printer setting value(s) for the printer settings 165 established during the process of FIG. 3 and/or using miscellaneous setting value(s) for the miscellaneous settings 185 established during the process of FIG. 3. The process can then start over at step 305 next time a print job or other high-power action is to be performed.

The process of FIG. 3 can be used for all actions performed by the POS device 100 or just for a subset of the actions performed by the POS device 100. For example, the process of FIG. 3 can be used only for actions performed by components that typically require high power draw levels, such as the printer 170 or touch-sensitive display screen 210. In some cases, the temperature sensor 175 of the POS device 100 can trigger the process of FIG. 3 by detecting that the measured temperature within the POS device 100 is below a predetermined threshold temperature.

FIG. 4 is a flow diagram illustrating undervoltage protection based on serialization of actions.

At step 405, the POS system 100 is performing multiple actions in parallel. This may correspond to multiple actions by multiple components, multiple processes/threads at the main processor 105 and/or secure processor(s) 110, or some combination thereof.

At optional step 410, a measured temperature is detected at the temperature sensor 175 and provided to the main processor 105.

At step 415, the main processor 105 determines a present power discharge capability rate of the battery 140 based on current conditions of the POS system 100 and/or of the battery 140. These current conditions may include all of the multiple actions performed in parallel, measured temperature measured at the temperature sensor 175 in optional step 410, any of the factors identified in the description of step 315 of FIG. 3 above, or some combination thereof. The present power discharge capability rate of the battery 140 can be calculated or determined in any of the ways described in the description of step 315 of FIG. 3 above.

At step 420, the main processor 105 calculates a first estimated power draw rate based on performing the multiple actions in parallel. The first estimated power draw may be calculated based on the measured temperature measured at the temperature sensor 175 in optional step 410 and/or any of the factors identified in the description of step 320 of FIG. 3 above, and can be calculated or determined in any of the ways described in the description of step 320 of FIG. 3 above.

At step 425, the main processor 105 calculates a difference between the present power discharge capability rate and the first estimated power draw rate at the given point or stretch of time in the present and/or near future, and determines whether or not that difference is less than a predetermined difference threshold value 745 as illustrated in FIG. 7. This difference and comparison may be performed in any of the ways described in the description of step 325 of FIG. 3 above. If the difference between the present power discharge capability rate and the first estimated power draw rate is greater than the predetermined difference threshold value 745, then the first estimated power draw rate is within the safe power draw range 730, no changes are needed, and step 445 is next. Otherwise, step 430 is next.

At step 430, the main processor 105 calculates a second estimated power draw rate based on serializing at least a subset of the multiple actions by the component(s) of the POS device 110 in comparison to the setup of step 405. That is, the main processor 105 calculates a second estimated power draw rate based on performance of at least the subset of the multiple actions in order, one after the other, rather than in parallel. The second estimated power draw may be calculated based on the measured temperature measured at the temperature sensor 175 in optional step 410 and/or any of the factors identified in the description of step 320 or step 330 of FIG. 3 above, and can be calculated or determined in any of the ways described in the description of step 320 or step 330 of FIG. 3 above. The second estimated power draw rate based on a greater level of serialization compared to the setup of step 405, and if, and if the process has returned to step 430 after a "no" at step 435, also a greater level of serialization and/or different serialization setup/order than the one previously tried at step 435.

At step 435, the main processor 105 calculates a difference between the present power discharge capability rate and the second estimated power draw rate at the given point or stretch of time in the present and/or near future, and determines whether or not that difference is less than the predetermined difference threshold value 745 as illustrated in FIG. 7. This difference and comparison may be performed in any of the ways described in the description of step 325 or step 335 of FIG. 3 above. If the difference between the present power discharge capability rate and the first estimated power draw rate is still less than the predetermined difference threshold value 745, then the main processor 105 can go back to step 430 and try again with a new serialization setup as described above with respect to step 430, for example by serializing all actions instead of just a subset, or by serializing a larger subset of actions, or by serializing a different subset of actions, or by serializing certain actions in a different order, or some combination thereof. The main processor 105 can go to step 305 of FIG. 3 and try settings changes alternatively or in addition to further attempts at serialization according to the process of FIG. 4, or may issue a warning to the user that the POS device 100 is about to shut down due to otherwise unavoidable brownout/blackout risk. If the difference between the present power discharge capability rate and the second estimated power draw rate is greater than the predetermined difference threshold value 745, then the second estimated power draw rate is within the safe power draw range 730, no further changes are needed, and step 440 is next.

At step 440, the main processor 105 ensures that when the multiple actions are performed, they are performed such that at least the subset of the multiple actions are performed serially based on the setup and/or order used in the calculation of the second estimated power draw rate of step 430, rather than performing the multiple actions in parallel as in the setup of step 405.

At step 445, the main processor 105 causes the multiple actions to be performed in accordance with any setup or order determined during the process of FIG. 4. If the process of FIG. 4 was performed together with the process of FIG. 3, main processor 105 causes the multiple actions to be performed using the printer setting value(s) for the printer settings 165 established during the process of FIG. 3 and/or using miscellaneous setting value(s) for the miscellaneous settings 185 established during the process of FIG. 3.

The process of FIG. 4 can be used any time parallel actions are performed by the POS device 100 or just for a subset of the actions parallel performed by the POS device 100. For example, the process of FIG. 4 can be used when at least one of the parallel actions is to be performed by components that typically require high power draw levels, such as the printer 170 or touch-sensitive display screen 210. In some cases, the temperature sensor 175 of the POS device 100 can trigger the process of FIG. 4 by detecting that the measured temperature within the POS device 100 is below a predetermined threshold temperature.

The processes of FIG. 3 and FIG. 4 are intended not necessarily to decrease sums of power drawn overall by the components of the POS device 100, though in some cases they may have this effect. The processes of FIG. 3 and FIG. 4 instead focus on decreasing power drawn at times of particularly high power draw on the battery 140 of the POS device 100, preventing the POS device 100 from suffering from undervoltage, brownouts, or blackouts from having too many components performing too many actions at the same time.

FIG. 5 is a chart illustrating multiple printer settings and corresponding possible printer setting values. The chart of FIG. 5 lists a number of exemplary printer settings in a "printer setting" column 505 and a number of corresponding possible printer setting values in a "possible printer setting values" column 510.

One printer setting 505 is printer speed, which may correspond to fast, medium, or slow possible printer setting values 510. Another printer setting 505 is black darkness, which identifies how darkly black (and optionally other colors) appear on the printed paper and may correspond to an amount of ink used, an amount of thermal energy used by a thermal print head, an amount of toner, an amount of energy used by a laser, or some combination thereof. The black darkness printer setting may correspond to dark, medium, or light possible printer setting values 510. Another printer setting 505 is print resolution, or a density of print dots or pixels on the printed page, which may correspond to high, medium or low possible printer setting values 510. Another printer setting 505 is print quality, which may correspond to high, medium or low possible printer setting values 510. Another printer setting 505 is font thickness or boldness, which may correspond to thick, medium, or thin possible printer setting values 510. Another printer setting 505 is font size, which may correspond to large, medium or small possible printer setting values 510. Another printer setting 505 is the actual font used, which may correspond to a "high-power font" used for titles or at warm/hot temperatures or when there is power to spare, a "medium-power font" used for ordinary text and at ordinary/room temperatures, and a "low-power font" used when power is at a premium and/or at low temperatures as possible printer setting values 510. Examples of a possible "high-power font," a possible "medium-power font," and a possible "low-power font" are provided in the possible printer setting values column 510 of FIG. 5.

Another printer setting 505 is font spacing, also referred to as "font tracking" in typography, which may correspond to expanded, normal or condensed possible printer setting values 510. Examples of expanded text, normal text, and condensed text are provided in the possible printer setting values column 510 of FIG. 5. Another printer setting 505 is size of printed images, which may correspond to large, medium or small possible printer setting values 510. The "size of printed images" printer setting may also be marked "images disabled" if power is at a premium and/or temperatures are low to indicate that images should not be printed. Another printer setting 505 is removal of characters in favor of shorthand, used to shorten words to use less characters by using abbreviations or shorthand, for example using "pymnt" instead of "payment." The "removal of characters" printer setting may correspond to enabled or disabled possible printer setting values 510, or may in some cases allow an indication of degree to which abbreviations or shorthand should be used.

Another printer setting 505 is printer power cycling, which involves turning the printer on and off periodically, sometimes to allow another action to be performed, sometimes simply to prevent power usage from spiking too high by cycling rapidly. The printer power cycling setting may correspond to enabled or disabled possible printer setting values 510. Another printer setting 505 is "remove optional print content," which concerns removing optional content, like coupons, merchant phone numbers, merchant email addresses, merchant physical addresses, merchant social media accounts, other merchant contact information, merchant website information, advertisements, bar codes or quick response ("QR") codes, and other content that is often printed onto receipts in addition to a transaction summary. The "remove optional print content" setting may correspond to possible printer setting values 510 such as enabled for all optional print content, enabled for coupons only, enabled for advertisements only, or disabled. Another printer setting 505 is "print pointer (QR code/link), which involves printing a pointer to more receipt information, where the pointer is in the form of a QR code and/or a link to a website. The "print pointer (QR code/link)" setting may correspond to possible printer setting values 510 including "enabled (pointer+)" printing the pointer and the rest of the receipt, "enabled (pointer only)" printing only the pointer to allow the printer to minimize amount printed for when power is at a premium or temperatures are low, or disabled.

Another printer setting 505 is disable printer, which involves disabling the printer entirely, for example mandating electronic receipts over email or handwritten receipts instead, for when power is at a premium or temperatures are low. The disable printer setting may correspond to enabled or disabled possible printer setting values 510. Another printer setting 505 is "print in parallel with other functions," which concerns whether the printer is allowed to print while the POS device 100 is performing certain other functions, such as rendering images or receipts, detecting touch via the touch-sensitive screen layer 125, reading transaction data via the transaction object(s) 115, or outputting audio via the speaker 215 or audio jack 240. Certain other functions, like continuing to run the main processor 105 and/or the display screen 120, may be allowed or disabled as well. The "print in parallel with other functions" setting may correspond to enabled or disabled possible printer setting values 510. Another printer setting 505 is printed color spectrum, which identifies what range of colors the printer is allowed to use in printing the receipt 240. The printed color spectrum setting may correspond to possible printer setting values 510 including full color, limited color, greyscale, or monochrome (i.e., single ink/toner/thermal color such as black, cyan, magenta, yellow, red, green, or blue). Another printer setting 505 is print scale, which identifies at what scale the receipt data rendered by the main processor 105 is to be printed onto the receipt paper. The print scale setting may correspond to possible printer setting values 510 including any percentage value from 1 percent to 100 percent, and could optionally also include any percentage value beyond 100 percent, such as 200 percent, 300 percent, 400 percent, 500 percent, or 1000 percent. Another printer setting 505 is double sided print, which indicates whether the printed should print on one side of the paper or on both sides. The double sided print setting may correspond to enabled or disabled possible printer setting values 510.

FIG. 6 is a chart illustrating multiple miscellaneous settings and corresponding possible miscellaneous setting values. The chart of FIG. 6 lists a number of exemplary miscellaneous settings in a "miscellaneous setting" column 605 and a number of corresponding possible miscellaneous setting values in a "possible miscellaneous setting values" column 610.

One miscellaneous setting 605 is processor clock speed pertaining to the main processor 105, which may correspond to fast, medium, or slow possible miscellaneous setting values 610. Another miscellaneous setting 605 is maximum number of processor cores used pertaining to the main processor 105, which may correspond to possible miscellaneous setting values 610 including any number of processor cores between 1 and the total number of cores in the processor (N), which may for example be 8. Another miscellaneous setting 605 is maximum number of parallel processes allowed (optionally other than those relating to an operating system, BIOS, or firmware) pertaining to the main processor 105, which may correspond to possible miscellaneous setting values 610 including any integer number of processes 1 or greater, such as 1, 2, 3, 4, 5, 6, 7, 8, 9, 10, 11, 12, 13, 14, 15, 16, 17, 18, 19, or 20. Another miscellaneous setting 605 is maximum number of parallel threads allowed (optionally other than those relating to an operating system, BIOS, or firmware) pertaining to the main processor 105, which may correspond to possible miscellaneous setting values 610 including any integer number of threads 1 or greater, such as 1, 2, 3, 4, 5, 6, 7, 8, 9, 10, 11, 12, 13, 14, 15, 16, 17, 18, 19, or 20. Another miscellaneous setting 605 is maximum number of active components of the POS device 100 allowed, optionally other than the main processor 105, which may correspond to possible miscellaneous setting values 610 including any integer number of active components 1 or greater, such as 1, 2, 3, 4, 5, 6, 7, 8, 9, 10, 11, 12, 13, 14, 15, 16, 17, 18, 19, or 20. Another miscellaneous setting 605 is GPU usage, which may correspond to possible miscellaneous setting values 610 including enabled fully, enabled in a limited capacity (e.g., calculating power discharge capability rates, calculating estimated power draw rates, calculating differences between power discharge capability rate and estimated power draw rates, rendering receipts, rendering interfaces for the display screen 120, or some combination thereof), or disabled. Any of the miscellaneous settings 605 identified in this paragraph can apply to one or both of the secure processor(s) 110 as well as the main processor 105, though one or both secure processor(s) 110 can optionally have their own counterpart miscellaneous settings 605 not illustrated in FIG. 6.

Another miscellaneous setting 605 is an NFC antenna poll rate, which may correspond to possible miscellaneous setting values 610 including fast, medium, or slow. Another miscellaneous setting 605 is an NFC antenna transfer speed, which may correspond to possible miscellaneous setting values 610 including fast, medium, or slow. Another miscellaneous setting 605 is a Wi-Fi antenna poll rate, which may correspond to possible miscellaneous setting values 610 including fast, medium, or slow. Another miscellaneous setting 605 is a Wi-Fi antenna transfer speed, which may correspond to possible miscellaneous setting values 610 including fast, medium, or slow. Another miscellaneous setting 605 is a cellular network antenna poll rate, which may correspond to possible miscellaneous setting values 610 including fast, medium, or slow. Another miscellaneous setting 605 is a cellular network antenna transfer speed, which may correspond to possible miscellaneous setting values 610 including fast, medium, or slow. Another miscellaneous setting 605 is a Bluetooth® or Bluetooth® Low Energy (BLE) antenna poll rate, which may correspond to possible miscellaneous setting values 610 including fast, medium, or slow. Another miscellaneous setting 605 is a Bluetooth® or Bluetooth® Low Energy (BLE) antenna transfer speed, which may correspond to possible miscellaneous setting values 610 including fast, medium, or slow.

Another miscellaneous setting 605 is a display screen brightness of the display screen 120, which may correspond to possible miscellaneous setting values 610 including bright, medium, or dim. Another miscellaneous setting 605 is a display screen backlight brightness of the display screen 120, which may correspond to possible miscellaneous setting values 610 including bright, medium, or dim. Another miscellaneous setting 605 is "disable light sensor(s)," which may refer to one or more light sensor(s) or camera(s) of the POS device 100 which may optionally be used to automatically control brightness of the display screen 120 or the backlight of the display screen 120. The "disable light sensor(s)" setting may correspond to possible miscellaneous setting values 610 including enabled or disabled. Another miscellaneous setting 605 is a touch surface poll rate of the touch-sensitive screen surface layer 125, which may correspond to how quickly/frequently voltage is driven across drive lines of the touch-sensitive screen surface layer 125 and how quickly/frequently voltage is sampled/sensed along sense lines of the touch-sensitive screen surface layer 125. The touch surface poll rate setting may correspond to possible miscellaneous setting values 610 including fast (corresponding to a more sensitive touch surface), medium, or slow (corresponding to a less sensitive touch surface).

Another miscellaneous setting 605 is a "disable antenna while printing" setting, which may refer to any combination of the antennae of the POS device 100, and which may correspond to possible miscellaneous setting values 610 including enabled or disabled. Another miscellaneous setting 605 is a "disable display while printing" setting, referring to functionality of the display screen 120, which may correspond to possible miscellaneous setting values 610 including enabled or disabled. Another miscellaneous setting 605 is a "disable touch sensitivity while printing" setting, referring to functionality of the touch-sensitive screen surface layer 125, which may correspond to possible miscellaneous setting values 610 including enabled or disabled. Another miscellaneous setting 605 is a "pre-render receipt in cart" setting, pre-rendering of the receipt in real-time while items are being added to the cart in the cart interface discussed in reference to the touch-sensitive display screen 210 of FIG. 2, which may correspond to possible miscellaneous setting values 610 including enabled or disabled. Another miscellaneous setting 605 is a "disable unused antennae" setting, which may refer to any combination of the antennae of the POS device 100 that are not currently in use and/or not predicted to be used in the near future, and which may correspond to possible miscellaneous setting values 610 including enabled or disabled. Another miscellaneous setting 605 is a "disable biometric sensor(s)" setting, which may refer to any combination of one or more biometric sensor(s) of the POS device 100, and which may correspond to possible miscellaneous setting values 610 including enabled or disabled. Another miscellaneous setting 605 is a "disable temperature sensor(s)" setting, referring to the one or more temperature sensor(s) 175, and which may correspond to possible miscellaneous setting values 610 including enabled or disabled. Another miscellaneous setting 605 is a "disable accelerometer/gyro(s)" setting, referring to the one or more accelerometer(s) and/or one or more gyroscope(s) that the POS device 100 may include, and which may correspond to possible miscellaneous setting values 610 including enabled or disabled. Another miscellaneous setting 605 is a "disable tamper detection" setting, referring to the tamper detection circuitry 130, and which may correspond to possible miscellaneous setting values 610 including enabled or disabled. Another miscellaneous setting 605 is a "disable indicator light" setting, referring to the optional indicator light(s), and which may correspond to possible miscellaneous setting values 610 including enabled or disabled. Disabling of tamper detection, or any of the other settings changes discussed with regard to FIG. 5 or FIG. 6, could be applied only temporarily and revert back immediately and automatically when power becomes more available and/or when temperature rises, for example.

It should be understood that any of the possible printer setting values 510 of FIG. 5 and possible miscellaneous setting values 610 of FIG. 6 that indicate ranges of values may include any number of possible values along that range rather than just the 2-4 possible values provided as examples. This includes any range of values that, in FIG. 5 or FIG. 6, reads "Large, medium, small," or "High, medium, low," or "Dark, medium, light," or "Fast, medium, slow," or "Thick, medium, thin," or "expanded, normal, condensed," or "high power font, medium power font, low power font," or "bright, medium, dim" or any variation thereof.

FIG. 7 is a bar chart comparing a power discharge capability rate to risk and safe power draw rates.

The bar chart of FIG. 7 starts at zero at a leftmost vertical axis, with bars stretching horizontally to the right in a positive direction. A power discharge capability rate 705 is shown. The power discharge capability rate 705 is broken into two ranges at a power draw risk threshold value 735, with everything to the left of (less than) the power draw risk threshold value 735 representing a safe power draw range 730. Any estimated power draw rate falling in the safe power draw range 730, such as the safe estimated power draw rate 720, is likely to be safe and not cause undervoltage/brownout/blackout.

Everything to the right of (greater than) the power draw risk threshold value 735 but to the left of (less than) the rightmost edge of (the actual value of) the power discharge capability rate 705 represents a brownout risk power draw range 740. Any estimated power draw rate falling in the brownout risk range power draw 740, such as the brownout risk estimated power draw rate 715, puts the POS device 100 at risk of undervoltage/brownout/blackout.

Everything to the right of (greater than) the power discharge capability rate 705 represents a blackout power draw range 750, which continues to the right beyond the bounds of the page. Any estimated power draw rate falling in the blackout power draw range 750, such as the blackout-causing estimated power draw rate 710, will almost certainly put the POS device 100 into undervoltage/brownout/blackout unless the actual power draw varies from estimates.

The predetermined difference threshold value 745, which is used in the calculations of steps 325, 335, 425, and 435 of FIG. 3 and FIG. 4, respectively, is the difference between the power discharge capability rate 705 and the predetermined power draw risk threshold value 735 representing the point between the safe power draw range 730 and the brownout risk power draw power draw range 740 as illustrated in FIG. 7. The power draw risk threshold value 735 may be a predetermined constant. The power draw risk threshold value 735 may be calculated based on the present power discharge capability rate and a predetermined constant, for example representing the predetermined constant subtracted from the present power discharge capability rate. The power draw risk threshold value 735 may be calculated based on the present power discharge capability rate and a predetermined percentage, for example representing a predetermined percentage of the present power discharge capability rate subtracted from the present power discharge capability rate, wherein the predetermined percentage is somewhere from zero percent to 100 percent, such as 40 percent, 35 percent, 30 percent, 25 percent, 20 percent, 15 percent, 10 percent, 5 percent, or some other percentage value.

While there are no units illustrated in FIG. 7, it should be understood that the power discharge capability rate 705, the various power draw rates 710/715/720, the power draw risk threshold value 735, the difference threshold value 745, the safe power draw range 730, the brownout risk power draw range 740, and the blackout power draw range 750 use the same units. These units may be power measurement units (e.g., watts, milliwatts, kilowatts), energy measurement units (e.g., joules, millijoules, kilojoules), current measurement units (e.g., amperes, milliamps, kiloamps), voltage measurement units (e.g., volts, millivolts, kilovolts), electric conductance measurement units (e.g., siemens, millisiemens, kilosiemens), charge measurement units (e.g., coloumbs, millicoloumbs, kilicoloumbs), resistance/reactance/impedance measurement units (e.g., ohms, milliohms, kiloohms), capacitance measurement units (e.g., farads, milli farads, kilofarads), inductance measurement units (e.g., henries, millihenries, kilohenries), frequency measurement units (e.g., hertz, millihertz, kilohertz), some product or fraction thereof, or some other combination thereof. The units may also be any of the units described above, or any product, fraction, or other combination of the units described above, multiplied by or divided by a unit of time (e.g., milliseconds, seconds, minutes, hours) or a unit of time squared (e.g., milliseconds$^2$, seconds$^2$, minutes$^2$, hours$^2$). That is, power discharge capability rate and power draw as used herein need not be in units of power, but may be in units used to describe energy, current, voltage, conductance, or any of the other types of units discussed above.

While the power discharge capability rate 705 and the various power draw rates 710/715/720 discussed with respect to FIG. 7 as well as FIG. 3 and FIG. 4 can be rates, it should be understood that they can also simply represent power discharge capability amounts and various power draw amounts, respectively, each corresponding to the same particular period of time. This period of time can be a period corresponding to the POS device 100 being on, a period corresponding to occurrence of a particular action, such as printing a receipt 240 via a printer 170, a period corresponding to a sub-action such as printing a particular character or line of the receipt 240, a period corresponding to performance of over a predetermined number of actions in parallel, a period corresponding to a temperature measurement being below a predetermined threshold, or some combination thereof.

FIG. 8 illustrates an exemplary computing system 800 that may be used to implement an embodiment of the present invention. For example, any of the computer systems or computerized devices described herein may include at least one computing system 800, or may include at least one component of the computer system 800 identified in FIG. 8. The computing system 800 of FIG. 8 includes one or more processors 810 and memory 810. Main memory 810 stores, in part, instructions and data for execution by processor 810. Main memory 810 can store the executable code when in operation. The system 800 of FIG. 8 further includes a mass storage device 830, portable storage medium drive(s) 840, output devices 850, user input devices 860, a graphics display 870, and peripheral devices 880.

The components shown in FIG. 8 are depicted as being connected via a single bus 890. However, the components may be connected through one or more data transport means. For example, processor unit 810 and main memory 810 may be connected via a local microprocessor bus, and the mass storage device 830, peripheral device(s) 880, portable storage device 840, and display system 870 may be connected via one or more input/output (I/O) buses.

Mass storage device 830, which may be implemented with a magnetic disk drive or an optical disk drive, is a non-volatile storage device for storing data and instructions for use by processor unit 810. Mass storage device 830 can store the system software for implementing embodiments of the present invention for purposes of loading that software into main memory 810.

Portable storage device 840 operates in conjunction with a portable non-volatile storage medium, such as a floppy disk, compact disk or Digital video disc, to input and output data and code to and from the computer system 800 of FIG. 8. The system software for implementing embodiments of the present invention may be stored on such a portable medium and input to the computer system 800 via the portable storage device 840.

The memory 820, mass storage device 830, or portable storage 840 may in some cases store sensitive information, such as transaction information, health information, or cryptographic keys, and may in some cases encrypt or decrypt such information with the aid of the processor 810. The memory 820, mass storage device 830, or portable storage 840 may in some cases store, at least in part, instructions, executable code, or other data for execution or processing by the processor 810.

Output devices 850 may include, for example, communication circuitry for outputting data through wired or wireless means, display circuitry for displaying data via a display screen, audio circuitry for outputting audio via headphones or a speaker, printer circuitry for printing data via a printer, or some combination thereof. The display screen may be any type of display discussed with respect to the display system 870. The printer may be inkjet, laser/toner based, thermal, or some combination thereof. In some cases, the output device circuitry 850 may allow for transmission of data over an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, a radio-frequency identification (RFID) wireless signal transfer, near-field communications (NFC) wireless signal transfer, 802.11 Wi-Fi wireless signal transfer, cellular data network wireless signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Output devices 850 may include any ports, plugs, antennae, or any other components necessary for the communication types listed above, such as cellular Subscriber Identity Module (SIM) cards.

Input devices 860 may include circuitry providing a portion of a user interface. Input devices 860 may include an alpha-numeric keypad, such as a keyboard, for inputting alpha-numeric and other information, or a pointing device, such as a mouse, a trackball, stylus, or cursor direction keys. Input devices 860 may include touch-sensitive surfaces as well, either integrated with a display as in a touchscreen, or separate from a display as in a trackpad. Touch-sensitive surfaces may in some cases detect localized variable pressure or force detection. In some cases, the input device circuitry may allow for receipt of data over an audio jack, a microphone jack, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, a radio-frequency identification (RFID) wireless signal transfer, near-field communications (NFC) wireless signal transfer, 802.11 Wi-Fi wireless signal transfer, cellular data network wireless signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Input devices 860 may include any ports, plugs, antennae, or any other components necessary for the communication types listed above, such as cellular SIM cards.

Display system 870 may include a liquid crystal display (LCD), a plasma display, an organic light-emitting diode (OLED) display, an electronic ink or "e-paper" display, a projector-based display, a holographic display, or another suitable display device. Display system 870 receives textual and graphical information, and processes the information for output to the display device. The display system 870 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 880 may include any type of computer support device to add additional functionality to the computer system. For example, peripheral device(s) 880 may include a modem, a router, an antenna, a printer, a bar code scanner, a quick-response ("QR") code scanner, a document/image scanner, a visible light camera, a thermal/infrared camera, an ultraviolet-sensitive camera, a night vision camera, a light sensor, a battery, a power source, or some combination thereof.

The components contained in the computer system 800 of FIG. 8 are those typically found in computer systems that may be suitable for use with embodiments of the present invention and are intended to represent a broad category of such computer components that are well known in the art. Thus, the computer system 800 of FIG. 8 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer system 800 may in some cases be a virtual computer system executed by another computer system. The computer can also include different bus configurations, networked platforms, multi-processor platforms, etc. Various operating systems can be used including Unix, Linux, Windows, Macintosh OS, Palm OS, Android, iOS, and other suitable operating systems.

In some cases, the computer system 800 may be part of a multi-computer system that uses multiple computer systems 800, each for one or more specific tasks or purposes. For example, the multi-computer system may include multiple computer systems 800 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 800 from different networks communicatively coupled together via the internet (also known as a "distributed" system).

The present invention may be implemented in an application that may be operable using a variety of devices. Non-transitory computer-readable storage media refer to any medium or media that participate in providing instructions to a central processing unit (CPU) for execution and that may be used in the memory 820, the mass storage 830, the portable storage 840, or some combination thereof. Such media can take many forms, including, but not limited to, non-volatile and volatile media such as optical or magnetic disks and dynamic memory, respectively. Some forms of non-transitory computer-readable media include, for example, a floppy disk, a flexible disk, a hard disk, magnetic tape, any other magnetic medium, flash memory, memristor memory, any other solid-state memory, a CD-ROM disk, digital video disk (DVD), blu-ray disk (BDD), or any other optical medium, Random Access Memory (RAM), Read-Only Memory (ROM), programmable read-only memory (PROM), erasable programmable read-only memory (EPROM), electrically erasable programmable read-only memory (EEPROM), FLASHEPROM, Resistive random-access memory (RRAM or ReRAM), Phase Change Memory (PCM), spin transfer torque RAM (STT-RAM), and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various flow diagrams provided and described above may show a particular order of operations performed by certain embodiments of the invention, it should be understood that such order is exemplary. Alternative embodiments may perform the operations in a different order, combine certain operations, overlap certain operations, or some combination thereof.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

The invention claimed is:

1. A method for ordering actions at a point of sale (POS) device, the method comprising:
    identifying that a plurality of actions are to be performed in parallel by the POS device according to one or more settings of the POS device;
    determining a plurality of resource utilization rates corresponding to the plurality of actions, wherein each of the plurality of resource utilization corresponds to performance of one of the plurality of actions by the POS device;
    calculating a first estimated resource utilization rate corresponding to performance of the plurality of actions in parallel by the POS device based on a sum of the plurality of resource utilization rates;
    receiving a measured temperature detected by a temperature sensor that is coupled to a battery of the POS device;
    determining, based on the measured temperature detected by the temperature sensor that is coupled to the battery, a resource utilization capability rate, wherein a resource utilization rate that exceeds the resource utilization capability rate is associated with risk of blackout for the POS device;
    identifying that a difference between the resource utilization capability rate and the first estimated resource utilization rate is less than a difference threshold associated with risk of brownout for the POS device; and
    causing the POS device to perform the plurality of actions serially at least in part by changing the one or more settings of the POS device automatically in response to identifying that the difference between the resource utilization capability rate and the first estimated resource utilization rate is less than the difference threshold, wherein the first estimated resource utilization rate is an estimated power draw rate, wherein the resource utilization capability rate is a power draw capability rate, and wherein the difference threshold is a power draw rate difference.

2. The method of claim 1, further comprising:
    determining a second estimated resource utilization rate corresponding to the plurality of actions being performed serially by the POS device; and identifying that a second difference between the resource utilization capability rate and the second estimated resource utilization rate is greater than or equal to the difference threshold.

3. The method of claim 1, wherein causing the POS device to perform the plurality of actions serially prevents an actual resource utilization rate of the POS device while performing the plurality of actions serially from coming within the difference threshold of the resource utilization capability rate.

4. The method of claim 1, further comprising:
identifying that the first estimated resource utilization rate falls within a brownout risk resource utilization range based on identifying that the difference is less than the difference threshold.

5. The method of claim 1, wherein the POS device includes a plurality of components, and wherein each of the plurality of actions are performed by different subsets of the plurality of components of the POS device.

6. The method of claim 5, wherein the plurality of components of the POS device include a processor of the POS device.

7. The method of claim 5, wherein the plurality of components of the POS device include a printer of the POS device.

8. The method of claim 7, further comprising:
identifying that the printer is to print with a printer setting set to a first printer setting value; and
changing a printer setting from the first printer setting value to a second printer setting value, the second printer setting value associated with a lower estimated resource utilization rate than the first printer setting value, causing the printer to print with the printer setting set to the second printer setting value.

9. The method of claim 1, further comprising:
identifying one or more additional actions other than the plurality of actions; and
causing the POS device to perform the one or more additional actions in parallel with one of the plurality of actions while the POS device performs the plurality of actions serially.

10. The method of claim 9, wherein a maximum number of parallel actions is not exceeded due to performance of the one or more additional actions in parallel with performance of the one of the plurality of actions serially.

11. The method of claim 1, wherein the temperature sensor includes one or more thermistors.

12. The method of claim 1, wherein the wherein the plurality of actions include a first action of a first action type and a second action of a second action type that is distinct from the first action type.

13. The method of claim 1, wherein the plurality of actions include at least a first action to be performed using a first component of the POS device and a second action to be performed using a second component of the POS device, wherein the first component and the second component are distinct component types relative to one another, wherein performance of the plurality of actions in parallel by the POS device includes use of the first component and the second component in parallel, wherein performance of the plurality of actions serially by the POS device includes use of the first component and the second component serially.

14. The method of claim 1, further comprising:
determining the difference threshold based on the resource utilization capability rate.

15. The method of claim 1, further comprising:
determining the difference threshold based on a predetermined percentage of the resource utilization capability rate.

16. The method of claim 1, further comprising:
determining the difference threshold based on a constant and the resource utilization capability rate.

17. The method of claim 1, further comprising:
in response to identifying that the difference is less than the difference threshold, changing a second set of one or more settings at the POS device to cause the POS device to disable, from an enabled state, at least one of: an action to be performed using the POS device, a component of the POS device, or a function of the POS device.

18. A system for ordering actions, the system comprising:
a memory storing instructions; and
a processor that executes the instructions, wherein execution of the instructions by the processor causes the processor to:
identify that a plurality of actions are to be performed in parallel by one or more components according to one or more settings associated with the one or more components,
determine a plurality of resource utilization rates corresponding to the plurality of actions, wherein each of the plurality of resource utilization rates corresponds to performance of one of the plurality of actions by the one or more components,
calculate a first estimated resource utilization rate corresponding to performance of the plurality of actions in parallel by one or more components based on a sum of the plurality of resource utilization rates,
receive a measured temperature detected by a temperature sensor coupled to a battery that is configured to provide power to the one or more components,
determine, based on the measured temperature detected by the temperature sensor that is coupled to the battery, a resource utilization capability rate, wherein a resource utilization rate that exceeds the resource utilization capability rate is associated with risk of blackout for the one or more components,
identify that a difference between the resource utilization capability rate and the first estimated resource utilization rate is less than a difference threshold associated with risk of brownout for the one or more components, and
cause performance of the plurality of actions serially by the one or more components at least in part by changing the one or more settings associated with the one or more components automatically in response to identifying that the difference between the resource utilization capability rate and the first estimated resource utilization rate is less than the difference threshold, wherein the first estimated resource utilization rate is an estimated power draw rate, wherein the resource utilization capability rate is a power draw capability rate, and wherein the difference threshold is a power draw rate difference.

19. The system of claim 18, wherein the one or more components include the processor.

20. The system of claim 18, wherein execution of the instructions by the processor causes the processor to further:
determine a second estimated resource utilization rate corresponding to the plurality of actions being performed serially by the one or more components, and identify that a second difference between the resource utilization capability rate and the second estimated resource utilization rate is greater than or equal to the difference threshold.

21. A non-transitory computer readable storage medium having embodied thereon a program, wherein the program is executable by a processor to perform a method of ordering actions, the method comprising:

identifying that a plurality of actions are to be performed in parallel by one or more components according to one or more settings associated with the one or more components;

determining a plurality of resource utilization rates corresponding to the plurality of actions, wherein each of the plurality of resource utilization rates corresponds to performance of one of the plurality of actions by the one or more components;

calculating a first estimated resource utilization rate corresponding to performance of the plurality of actions in parallel by the one or more components based on a sum of the plurality of resource utilization rates;

receiving a measured temperature detected by a temperature sensor coupled to a battery that is configured to provide power to the one or more components;

determining, based on the measured temperature detected by the temperature sensor that is coupled to the battery, a resource utilization capability rate, wherein a resource utilization rate that exceeds the resource utilization capability rate is associated with risk of blackout for the one or more components;

identifying that a difference between the resource utilization capability rate and the first estimated resource utilization rate is less than a difference threshold associated with risk of brownout for the one or more components; and causing the one or more components to perform the plurality of actions serially at least in part by changing the one or more settings associated with the one or more components automatically in response to identifying that the difference between the resource utilization capability rate and the first estimated resource utilization rate is less than the difference threshold, wherein the first estimated resource utilization rate is an estimated power draw rate, wherein the resource utilization capability rate is a power draw capability rate, and wherein the difference threshold is a power draw rate difference.

* * * * *

UNITED STATES PATENT AND TRADEMARK OFFICE
CERTIFICATE OF CORRECTION

PATENT NO. : 11,561,593 B2
APPLICATION NO. : 16/923671
DATED : January 24, 2023
INVENTOR(S) : Cory Douthat et al.

It is certified that error appears in the above-identified patent and that said Letters Patent is hereby corrected as shown below:

In the Claims

In Claim 1, Column 24, Line 33:
"the plurality of resource utilization corresponds to"
Should be corrected as follows:
"the plurality of resource utilization rates corresponds to"

Signed and Sealed this
Twentieth Day of February, 2024

Katherine Kelly Vidal
*Director of the United States Patent and Trademark Office*